United States Patent [19]

Meckler

[11] Patent Number: 4,819,444
[45] Date of Patent: Apr. 11, 1989

[54] AIR CONDITIONING APPARATUS

[75] Inventor: Gershon Meckler, Monmouth Beach, N.J.

[73] Assignee: Manville Sales Corporation, Denver, Colo.

[21] Appl. No.: 151,856

[22] Filed: Feb. 3, 1988

Related U.S. Application Data

[63] Continuation-in-part of Ser. No. 883,013, Jul. 8, 1986, abandoned, and a continuation of Ser. No. 732,561, May 9, 1985, abandoned.

[51] Int. Cl.$^4$ .............................................. F25B 27/02
[52] U.S. Cl. ..................................... 62/238.6; 62/271; 62/33; 62/335; 62/323.1
[58] Field of Search ...................... 62/246, 271, 238.6, 62/333, 335, 323.1

[56] References Cited

U.S. PATENT DOCUMENTS

| | | | |
|---|---|---|---|
| 2,200,243 | 5/1940 | Newton et al. | 62/271 X |
| 3,102,399 | 9/1963 | Meckler | 62/271 |
| 4,011,731 | 3/1977 | Meckler | 62/271 X |
| 4,171,624 | 10/1979 | Meckler et al. | 62/271 |
| 4,484,449 | 11/1984 | Muench | 62/335 X |
| 4,519,217 | 5/1985 | Phillips et al. | 62/256 |

Primary Examiner—William E. Tapolcai
Attorney, Agent, or Firm—John C. Purdue; David C. Purdue

[57] ABSTRACT

Apparatus for conditioning the air of a supermarket and for removing heat from refrigerated display cases therein is disclosed. The apparatus includes first and second refrigeration apparatus, a chemical dehumidifier which uses a desiccant, a regenerator for the dehumidifier, means for transferring heat to the regenerator to enable regeneration of the desiccant of said dehumidifier, and means for causing air of flow in dehumidifying relationship with the dehumidifier and then into the space. The apparatus is operable to maintain the temperature of the case below that of the supermarket and to deliver dehumidified air to the supermarket to maintain a humidity ratio therein below about 50 grains of moisture per pound of dry air. The first refrigeration apparatus has a heat rejecting section, a compressor, and a heat absorbing section which is operable to transfer heat from the refrigerated case. The second refrigeration apparatus has a heat absorbing section and a heat rejecting section, and is operable to transfer heat from the condenser of the first refrigeration apparatus to the heat absorbing section of the second refrigeration apparatus.

99 Claims, 12 Drawing Sheets

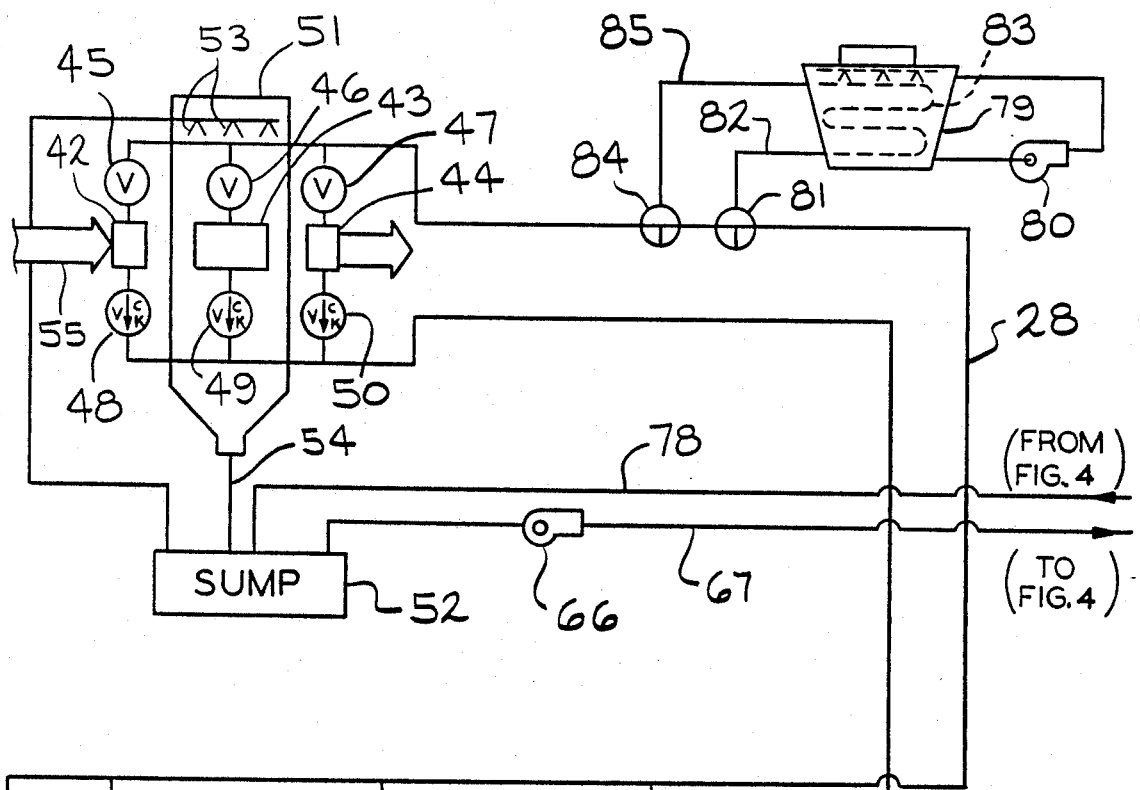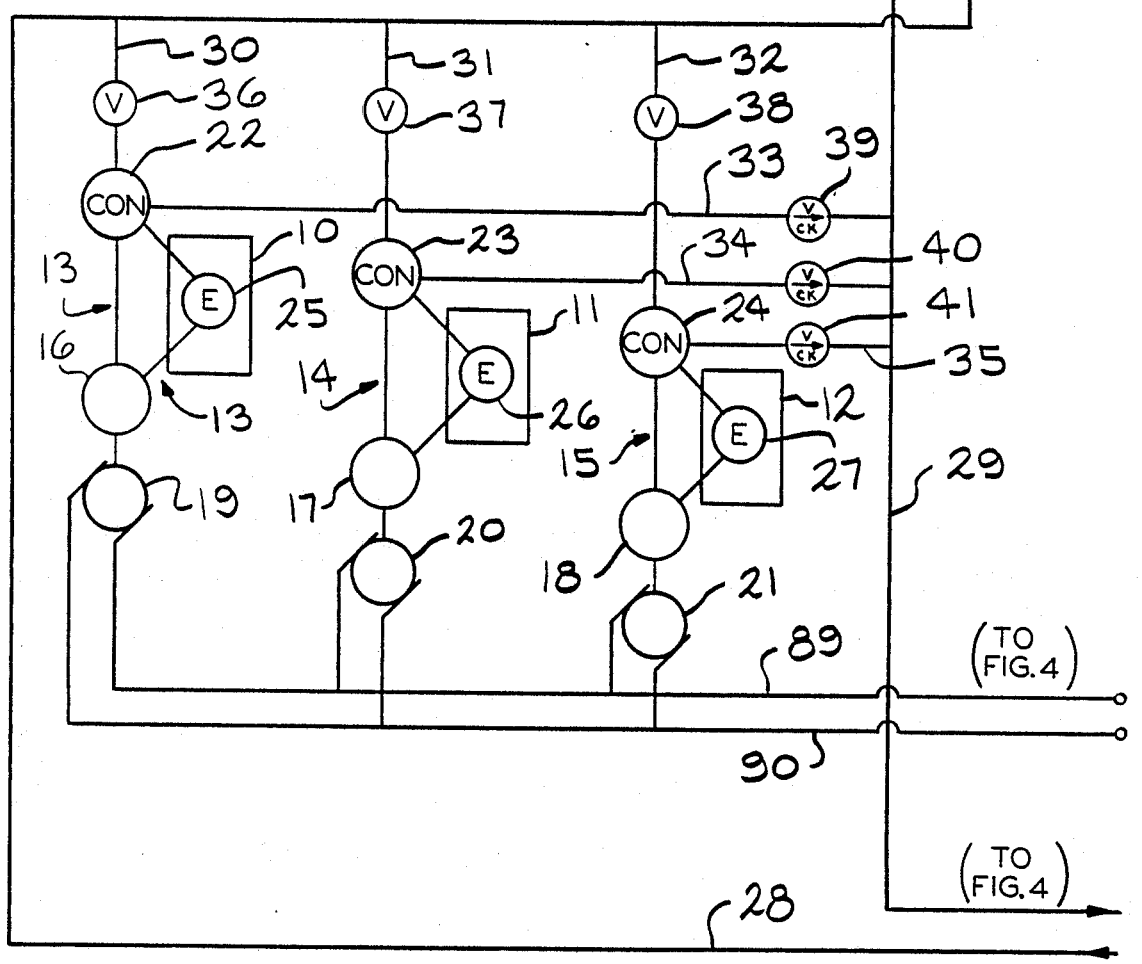
FIG. 3

AIR CONDITIONING APPARATUS

BACKGROUND OF THE INVENTION

Reference to Related Applications

This is a continuation in part of application Ser. No. 883,013, filed July 8, 1986, now abandoned, and a continuation of application Ser. No. 732,561, May 9, 1985, now abandoned.

Field of the Invention

This invention relates to air conditioning apparatus which is admirably suited for a supermarket or other building in which frozen foods or other articles are stored refrigerated cases which are maintained at comparatively low temperatures and are either left open or opened frequently. The apparatus comprises first and second refrigeration apparatus, a chemical dehumidifier which uses a desiccant, a regenerator for the humidifier, means for transferring heat to the regenerator to enable regeneration of the desiccant of the dehumidifier, means for transferring heat from the condenser of the first refrigeration apparatus to the heat absorbing section of the second refrigeration apparatus, means for transferring heat from the storage containers to the heat absorbing section of the first refrigeration apparatus, and means for causing air to flow in dehumidifying relationship with the dehumidifier and then into said space. The apparatus is operable to maintain the temperature of the part thereof to which heat is transferred from the storage containers below the dewpoint maintained in the space and to deliver dehumidified air to maintain the humidity of the air seen by that part of the apparatus sufficiently low to prevent the transfer of latent heat from the space to the first refrigeration apparatus.

The Prior Art

It has been recognized that supermarkets are energy intensive, and that approximately ½ of the electricity that they use drives compressors for cases in which food is displayed while another 10 to 15 percent drives compressors of air conditioning apparatus (TECHNOLOGY PROFILE, Gas Research Institute, October, 1983). As an expedient to reduce the use of electricity and to save energy costs, the Gas Research Institute publication proposes desiccant dehumidification apparatus which includes a gas fired heater for regeneration of a desiccant wheel dehumidifier.

U.S. Pat. No. 4,280,335 discloses air conditioning apparatus for sueprmarkets which includes equipment for making and storing ice "in the late evening and early morning hours" and the use of cold water from ice storage first to cool produce areas and then to cool the ambient air in the supermarkets.

SUMMARY OF THE INVENTION

The instant invention is apparatus for conditioning the air of a closed space in which there are storage containers for a product which is stored for sale at a temperature below the space temperature, for example, a supermarket. The apparatus comprises first refrigeration apparatus, second refrigeration apparatus, a chemical dehumidifier which uses a desiccant, a regenerator for the dehumidifier, means for transferring heat to the regenerator to enable regeneration of the desiccant of the dehumidifier, means for transferring heat from the condenser of the first refrigeration apparatus to the heat absorbing section of the second refrigeration apparatus, means for transferring heat from the storage containers to the heat absorbing section of the first refrigeration apparatus, and means for causing air to flow in dehumidifying relationship with the dehumidifier and then into said space. The first and second refrigeration apparatus includes a heat absorbing section and a heat rejecting section, while the first additionally includes a compressor. The means for transferring heat from the storage containers to the heat absorbing section of the first refrigeration apparatus is operable to maintain product in the storage containers at a temperature below the space temperature, while the apparatus is operable to deliver dehumidified air to the space to maintain the humidity of the air which contacts the part of the apparatus to which heat is transferred from the storage containers sufficiently low to prevent the transfer of latent heat from the space to the first refrigeration apparatus.

BRIEF DESCRIPTION OF THE DRAWINGS

FIGS. 3 and 4, together, constitute a schematic diagram of a modification of the apparatus of FIGS. 1 and 2 which includes a turbine and a generator.

DESCRIPTION OF THE PREFERRED EMBODIMENTS

Figure 1:
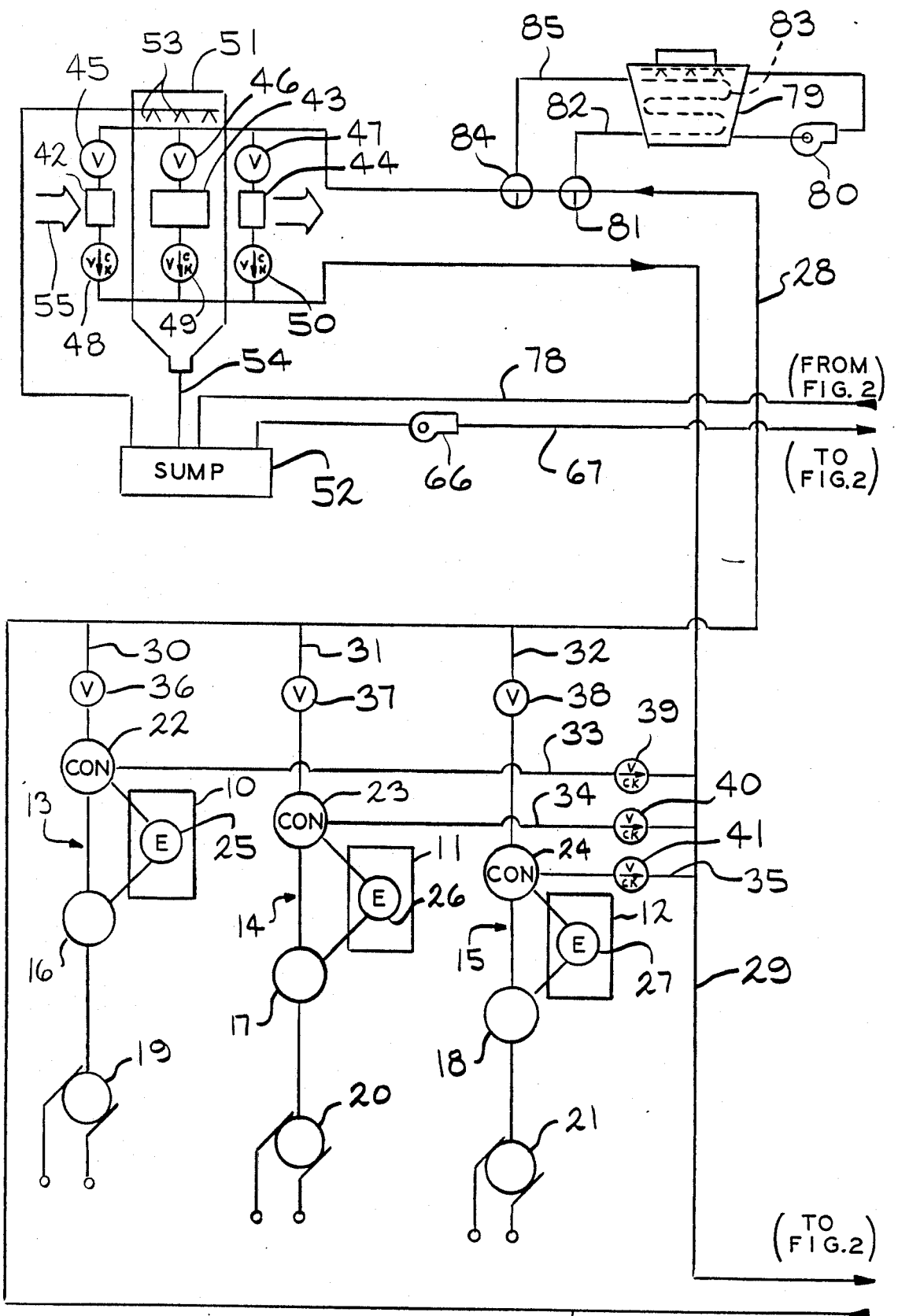
FIGS. 1 and 2, together, constitute a schematic diagram of apparatus according to the instant invention.
Figure 2:
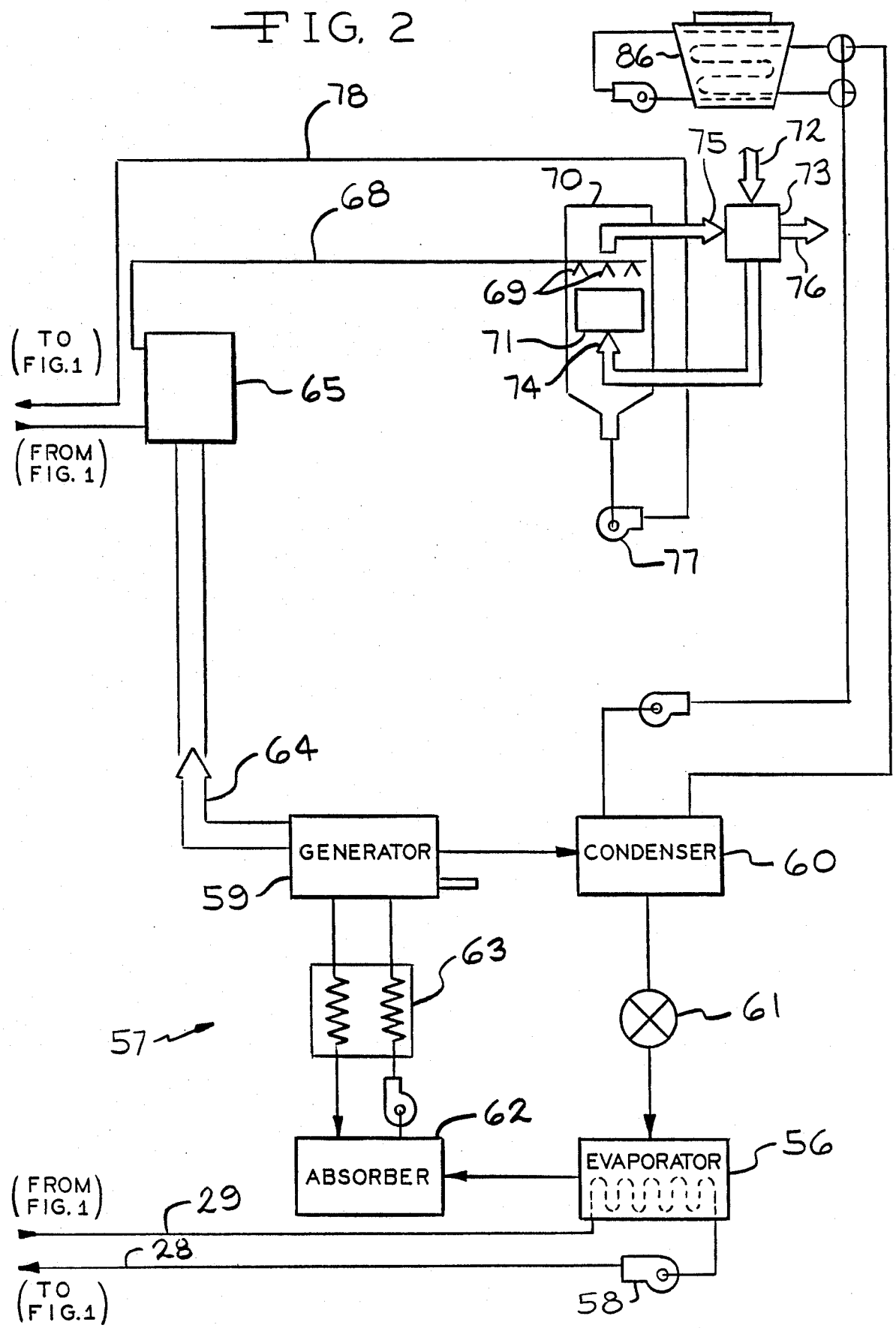

Apparatus shown in FIGS. 1 and 2 is particularly useful in supermarkets where condensation on the coils of refrigerated cases presently constitutes a serious problem. Referring to FIG. 1, the apparatus includes refrigerated cases 10, 11 and 12 in which frozen food is displayed. The cases 10, 11 and 12 are served, respectively, by compression refrigeration apparatus 13, 14 and 15 comprising compressors 16, 17 and 18 driven by motors 19, 20 and 21, condensers 22, 23 and 24, and evaporators 25, 26 and 27. Refrigerant is circulated from each of the compressors 16, 17 and 18 to the associated condenser, then to the associated evaporator, which is physically within one of the refrigerated cases, and back to the compressor. Chilled water from a line 28 to used to transfer heat from the condensers 22, 23 and 24, the condensers being connected in parallel between the line 28 and a return line 29 by supply lines 30, 31 and 32 and return lines 33, 34 and 35. Control valves 36, 37 and 38 regulate the flow of chilled water to the condensers 22, 23 and 24, while check valves 39, 40 and 41 prevent a reverse flow of cooling water from the return line 29 to the condensers. A cooling coil 42, a contactor 43 and a cooling coil 44 are also connected in parallel between the chilled water line 28 and the return line 29 being served, respectively, by control valves 45, 46 and 47 and check valves 48, 49 and 50.

The apparatus also includes a conditioner 51 in which an aqueous solution of lithium chloride or other hygroscopic material which is pumped from a sump 52 is sprayed from nozzles 53 for flow over the contactor 43 and return through a line 54 to the sump 52.

Air, as indicated by an arrow 55 flows in contact with the cooling coil 42, through the conditioner 51 where it comes into contact with the hygroscopic liquid, and is discharged from the conditioner 51, flowing in contact with the cooling coil 44 and then to the space served by the apparatus, for example, a supermarket. Sensible heat is removed by the cooling coil 42, by the contactor 43, by the cooling coil 44, or by two or more of these heat transfer devices so that the air circulated to the supermarket is at a suitable dry bulb temperature, say 70° F. (21° C.); contact with the aqueous lithium chloride or other solution in the conditioner 51 dehumidifies the air to a low moisture content, say twenty grains of water vapor per pound of dry air. This air is delivered to the supermarket at a rate sufficiently high that condensation on the coils of the refrigerated cases 10, 11 and 12 is at least substantially reduced.

Chilled water in the line 28 is supplied by an evaporator 56 (FIG. 2) of absorption refrigeration apparatus indicated generally at 57. The chilled water is circulated from the evaporator 56 by a pump 58, and returns to the evaporator 56 in the line 29. The absorption refrigeration apparatus 57 comprises, in addition to the evaporator 56, a gas fired generator 59, a condenser 60, and expander 61, an absorber 62 and a heat exchanger 63. The apparatus 57 operates conventionally, with the exception that exhaust gases from the generator 59 are directed, as indicated by an arrow 64 into and through a gas to liquid heat exchanger 65.

Referring to FIG. 1, a pump 66 causes lithium chloride or another hygroscopic solution to flow from the sump 52 through a line 67 to the heat exchanger 65 (FIG. 2) and from thence through a line 68 to sprays 69 within a regenerator 70. The lithium chloride or the like solution is heated in the heat exchanger 65 to a temperature of, say, 135° F. (56° C.); as a consequence, it is concentrated when it is sprayed in the regenerator 70 over a contactor 71 and comes into contact with air which enters the system as indicated by an arrow 72, flows through a heat exchanger 73 and upwardly through and from the regenerator 70 as indicated by arrows 74 and 75, passing through the heat exchanger 73, and leaving the system as indicated by an arrow 76. Concentrated lithium chloride or other hygroscopic solution is returned by a pump 77 which delivers into a line 78 from the regenerator 70 to the sump 52 (FIG. 1).

When the ambient wet bulb temperature is sufficiently low that dehumidification is not required, heat from the condensers 22, 23 and 24 can be rejected in a cooling tower 79 by energizing a pump 80, turning a valve 81 to direct water from the line 28 through a line 82 into a coil 83 of the tower 79, and turning a valve 84 so that water from the coil 83 can flow through a line 85 and back into the line 28. In this mode of operation the absorption refrigeration apparatus 57 (FIG. 2) is not energized, but the pump 58 continues to circulate water as previously described.

When the absorption refrigeration apparatus 57 is operating, heat from the condenser thereof is transferred from the system by a cooling tower 86.

Figure 4:
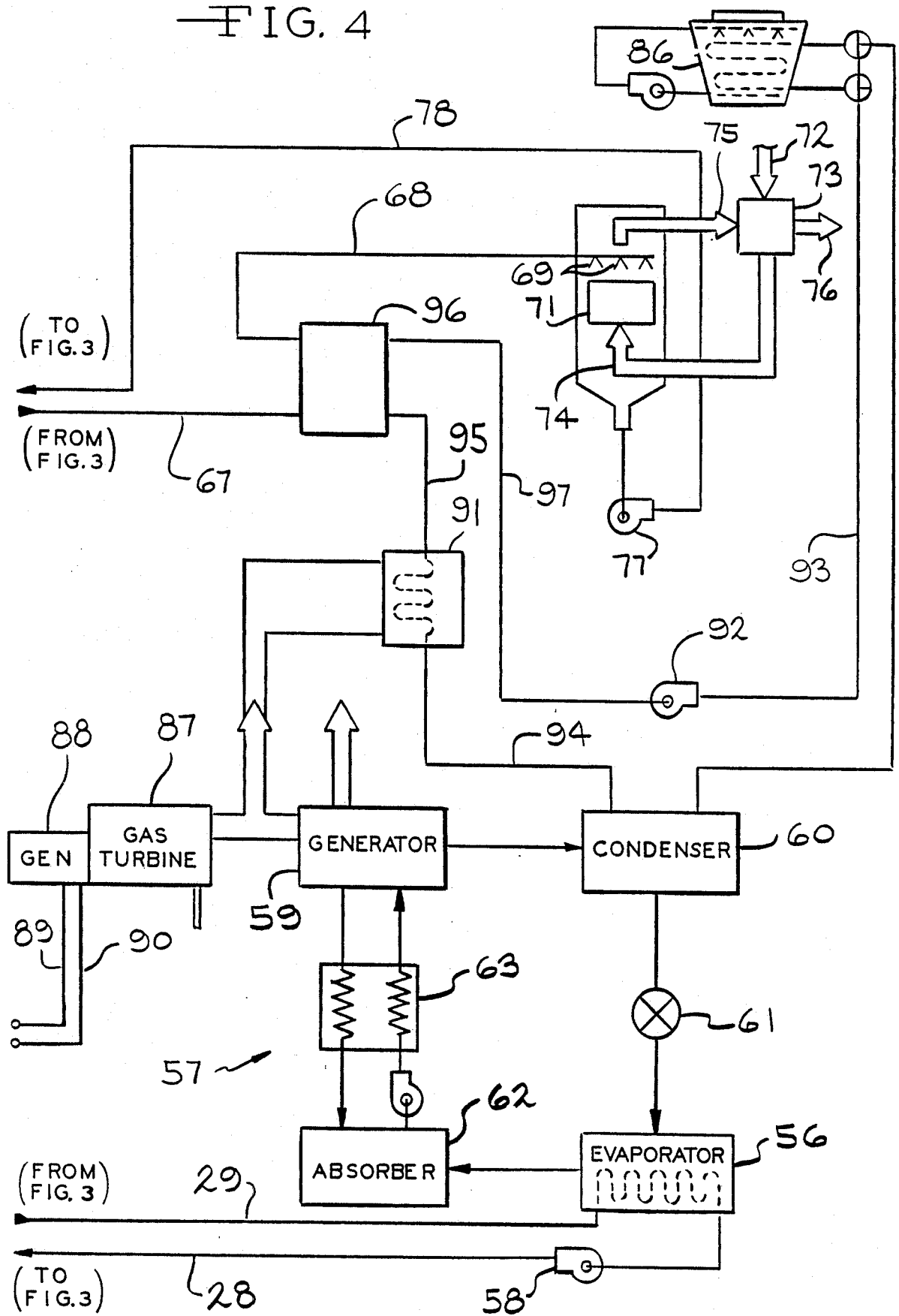

The apparatus of FIGS. 1 and 2 and that of FIGS. 3 and 4 are the same, in most respects, as indicated by the identity of reference numerals, the principal differences being that the FIG. 3/4 apparatus includes a turbine 87 which drives a generator 88, that combustion products from the turbine 87 provide heat for the generator 59 of the absorption apparatus 57, and that electricity from the generator 88 is circulated through lines 89 and 90 to energize the motors 19, 20 and 21 (FIG. 3). In addition, combustion products from the turbine 87 (FIG. 4) are used as a heat source in a gas to liquid heat exchanger 91; water is circulated by a pump 92 through a line 93 to the condenser 60 and from thence through a line 94, the heat exchanger 91, a line 95, a liquid-liquid heat exchanger 96 and a line 97 back to the pump 92. Water circulated as just described is heated, first by heat transferred thereto from the condenser 60 and then by heat from the combustion products which is transferred thereto in the exchanger 91; in the heat exchanger 96 heat is then transferred from the water to hygroscopic liquid from the line 67. Hot hygroscopic liquid flows from the heat exchanger 96 through the line 68 to the regenerator 70 for regeneration as previously described.

Figure 5:
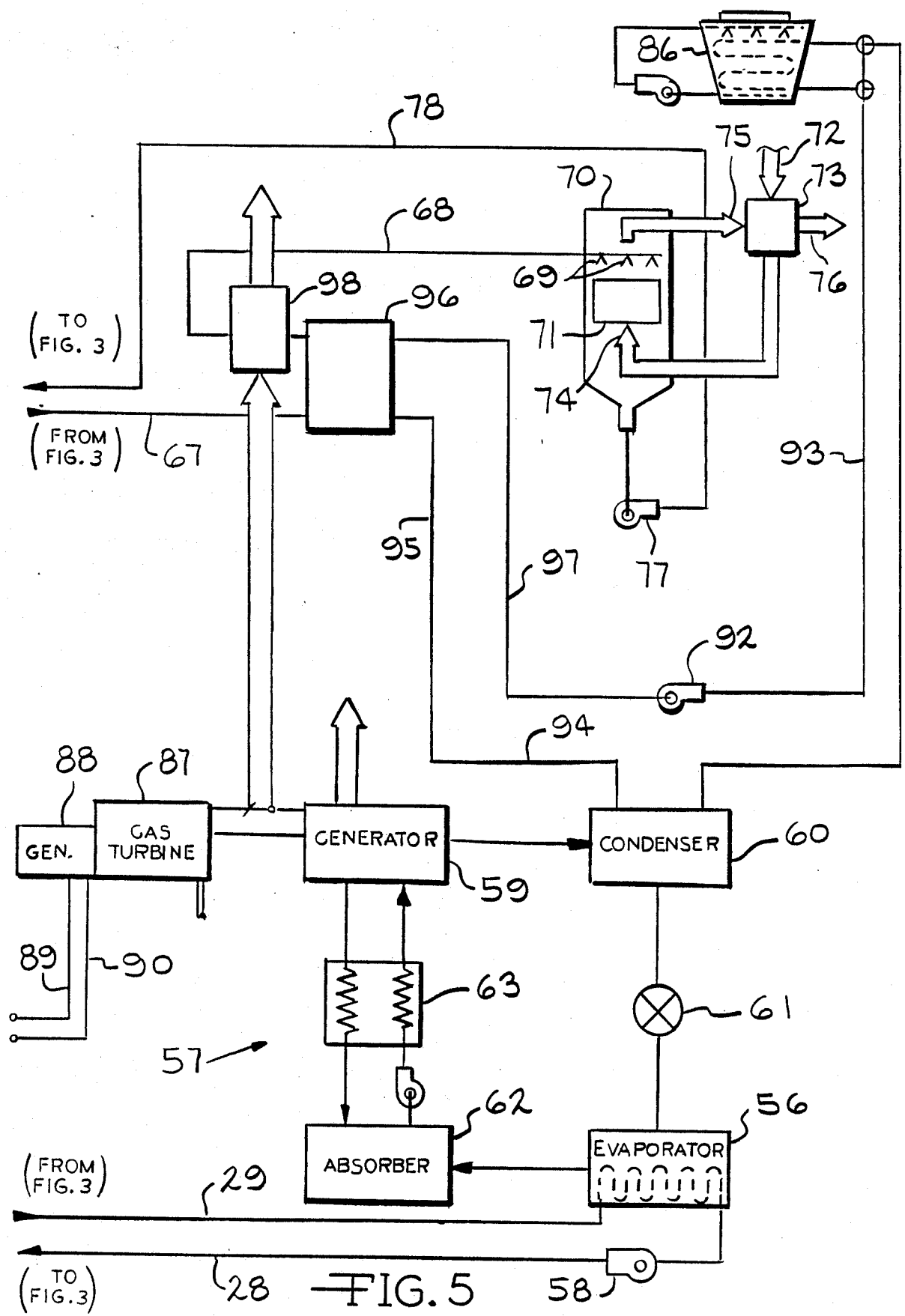
FIG. 5, together with FIG. 3, constitutes a schematic diagram of a further modification of the apparatus of Figs. 3 and 4.

A modification of the apparatus of FIGS. 3 and 4 is shown in FIG. 5, the FIG. 3 portion of the apparatus being unchanged. The gas to liquid heat exchanger 91 of FIG. 4 is eliminated, so that, in the FIG. 5 apparatus, only heat from the condenser 60 is transferred to water circulated by the pump 92. Heat from the exhaust of the gas turbine 87, however, is transferred to hygroscopic liquid which flows through the line 68 to the regenerator 70; this is done in a gas to liquid heat exchanger 98.

Figure 6:
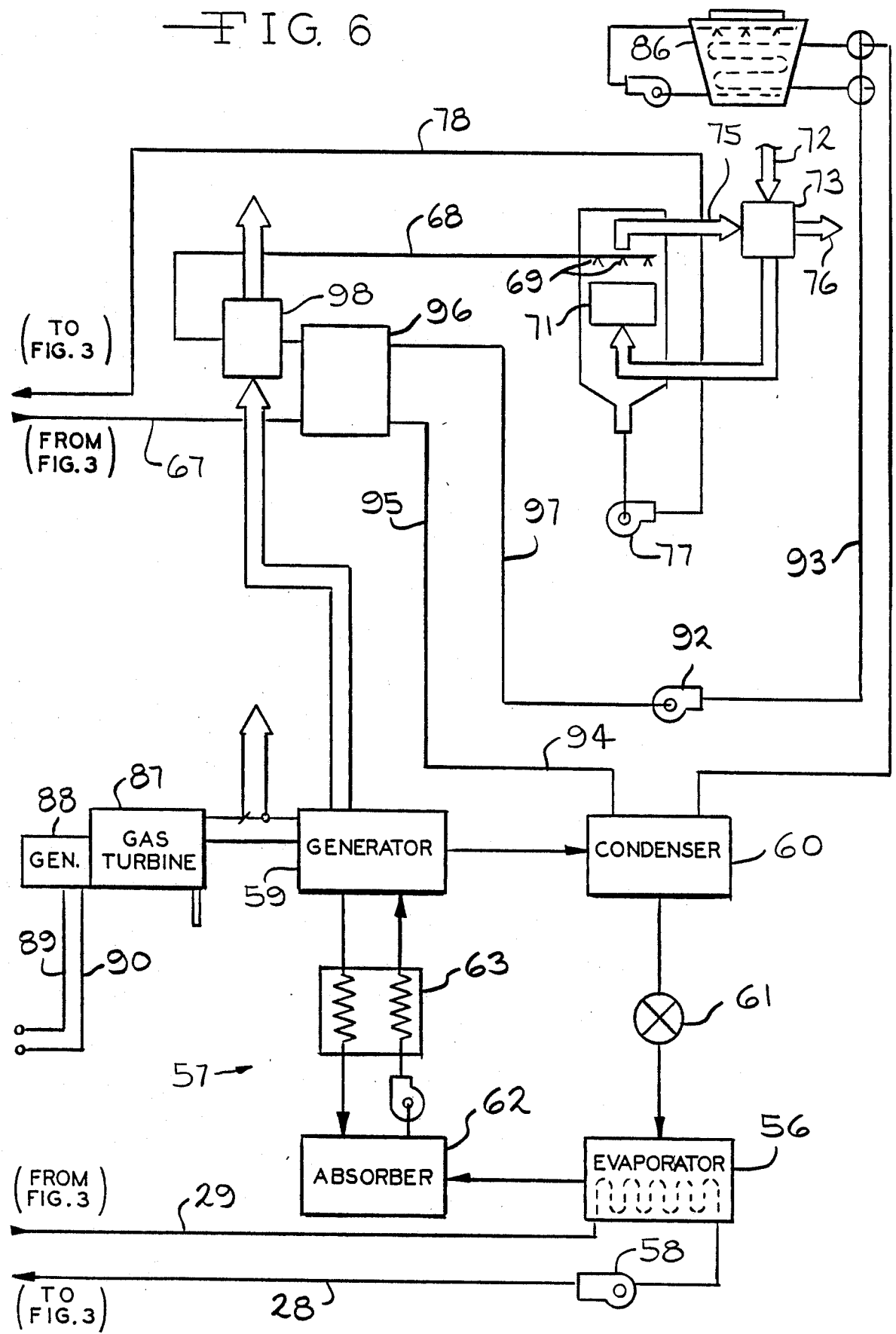
FIG. 6, together with FIG. 3, constitutes a schematic diagram of still another modification of the apparatus of FIGS. 3 and 4.

A further modification of the apparatus of FIGS. 3 and 4 is shown in FIG. 6, the FIG. 3 portion of the apparatus again being unchanged. The FIG. 6 portion of the apparatus differs from that of FIG. 5 only in that it is heat from the generator 59 that is transferred to the hygroscopic liquid in the heat exchanger 98.

Figure 7:
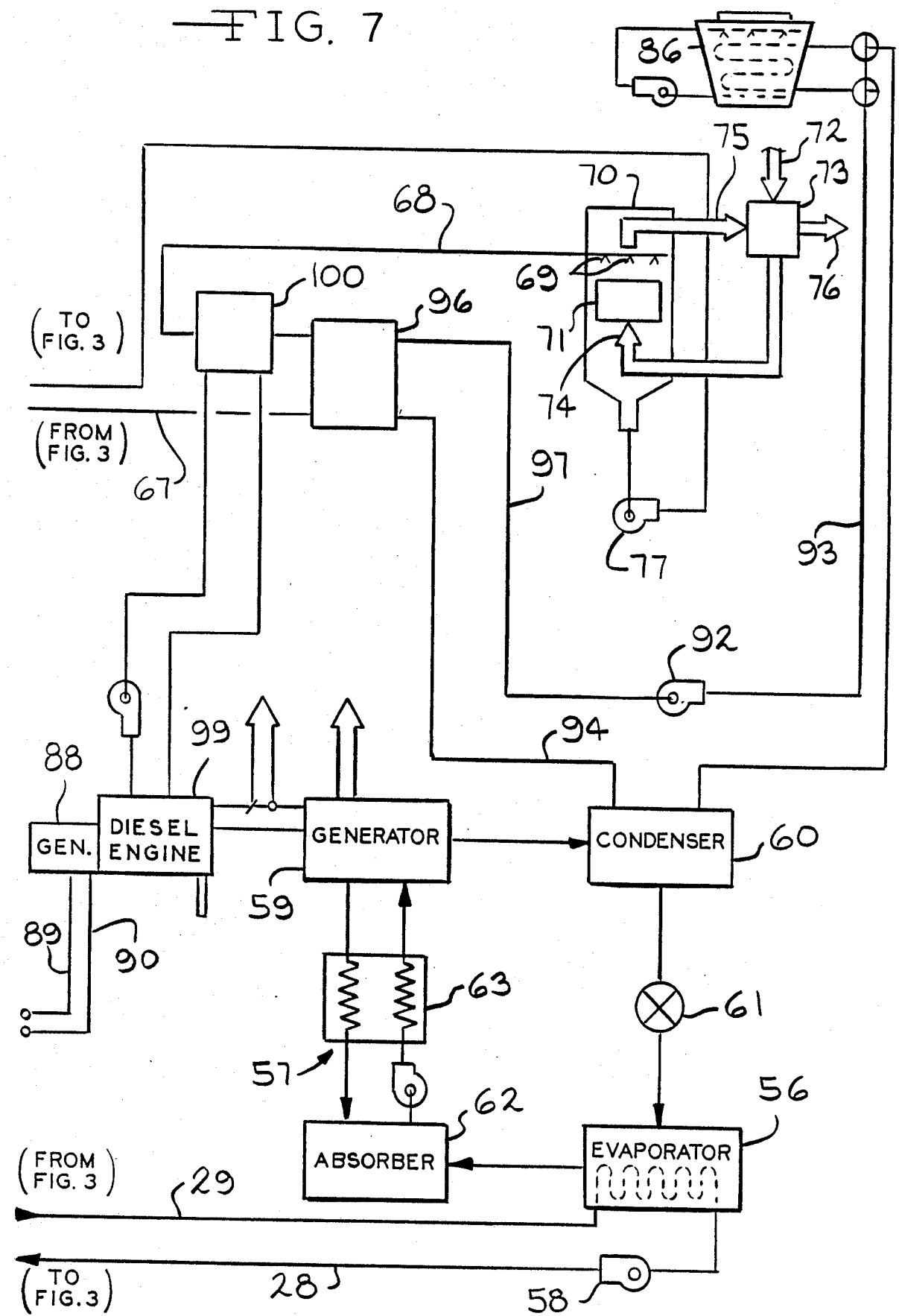
FIG. 7, together with FIG. 3, constitutes a schematic diagram of yet another modification of the apparatus of FIGS. 3 and 4.

Still another modification of the apparatus of FIGS. 3 and 4 is shown in FIG. 7, the FIG. 3 portion of the apparatus once more being unchanged. The gas turbine 87 of the FIG. 6 apparatus has been replaced, in that of FIG. 7, by a diesel engine 99 which drives the generator 88; the exhaust gases from the diesel 99 furnish heat to the generator 59, while cooling jacket water therefrom furnishes heat in a liquid-liquid heat exchanger 100 to desiccant which flows through the line 68 to the regenerator 70.

Figure 8:
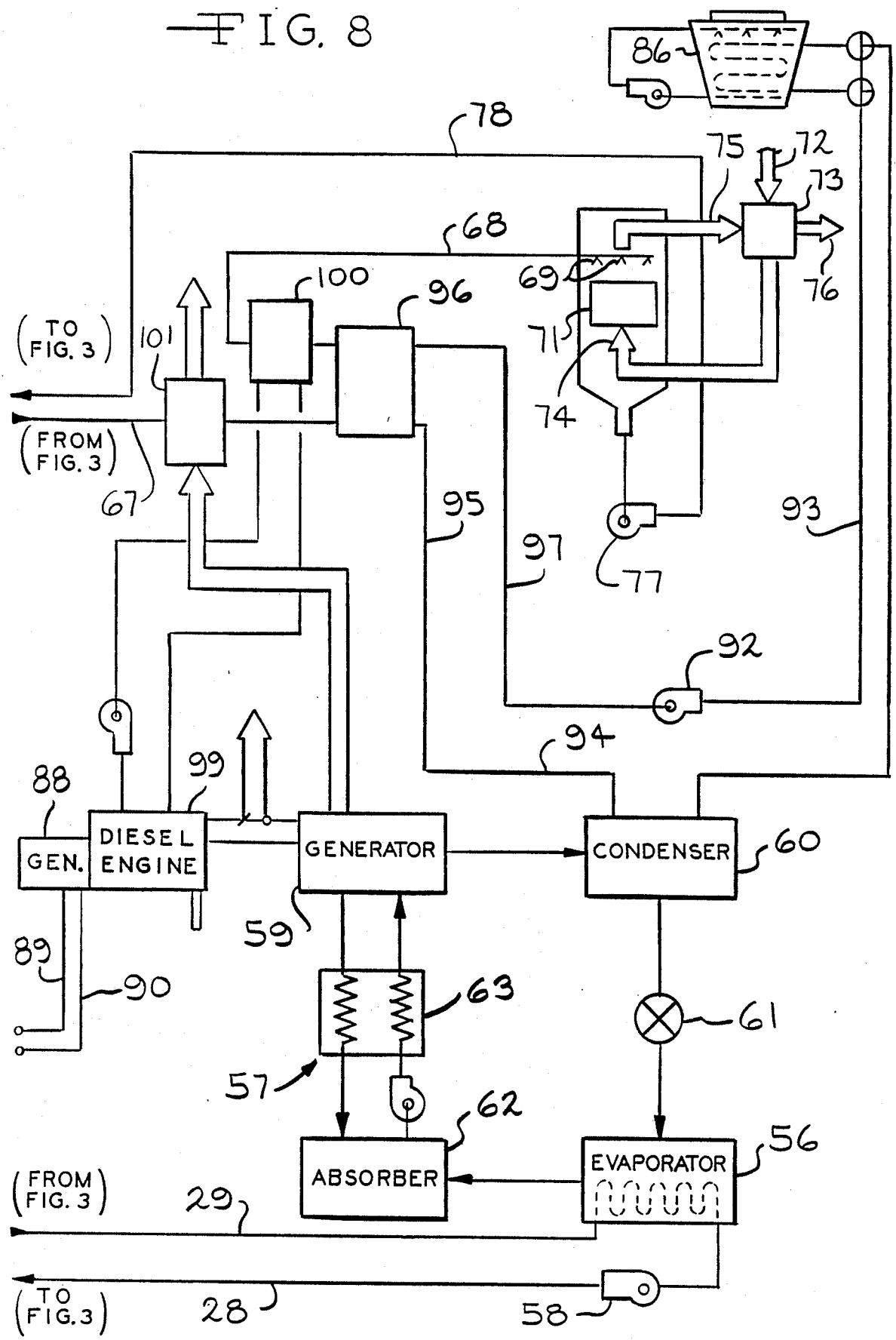
FIG. 8, together with FIG. 3, constitutes a schematic diagram of a further modification of the apparatus of Figs. 3 and 4.

Yet another modification of the apparatus of FIGS. 3 and 4 is shown in FIG. 8, the FIG. 3 portion of the apparatus still being unchanged. The FIG. 7 apparatus has been enlarged, in that of FIG. 8, by the addition of a gas to liquid heat exchanger 101 in which heat from the exhaust gases leaving the generator 59 is transferred to hygroscopic liquid flowing in the line 67 before it reaches the heat exchanger 96.

Figure 9:
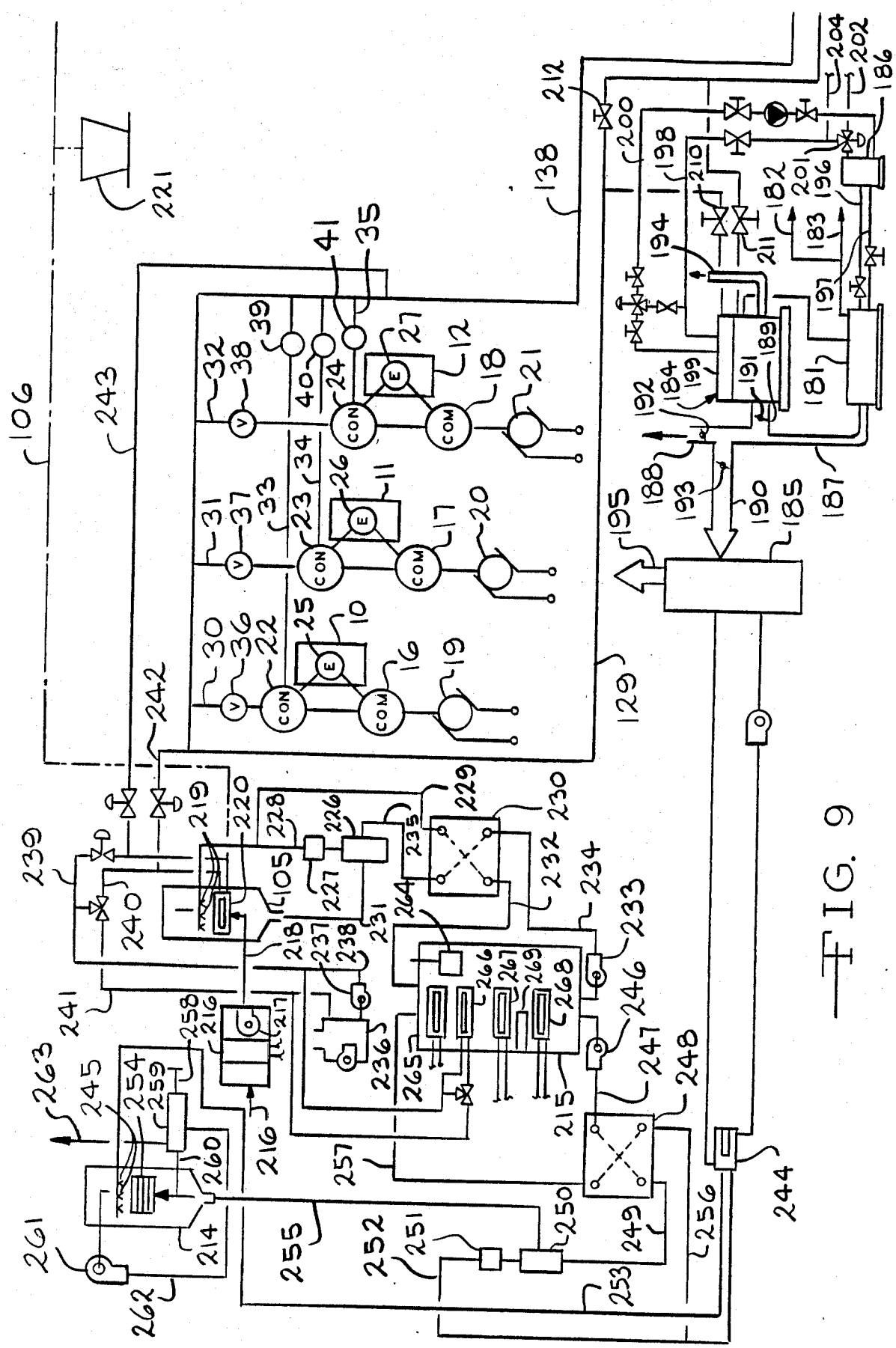
FIGS. 9 and 10, together, constitute a schematic diagram of another embodiment of apparatus according to the invention.
Figure 10:
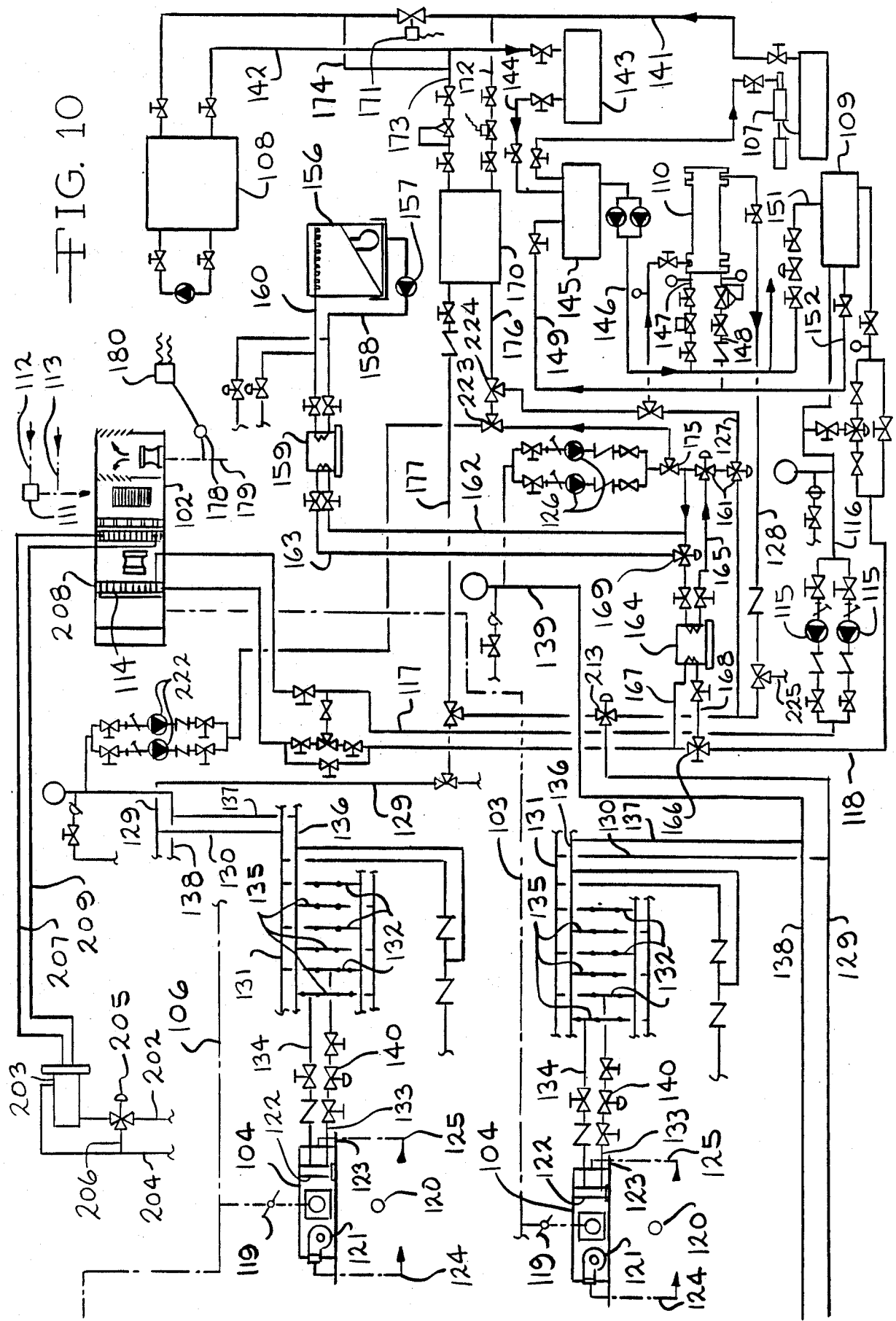

Apparatus shown in FIGS. 9 and 10 comprises an air handler 102 which, through a plurality of ducts 103 (one of which is shown in FIG. 9), serves a first plurality of induction mixing units 104 (one of which is shown in FIG. 9) and a contactor 105 which, through a plurality of ducts 106 (one of which is shown in FIG. 9) serves a second plurality of induction mixing units 104 (one of which is shown in Fig. 9). The air handler 102 is served by refrigeration apparatus which includes a compressor 107, an evaporative condenser 108, and two different evaporators, one which serves an ice storage tank 109 and one which serves a water chiller 110. The evaporator which serves the ice storage tank 109 operates to product ice when its operation does not increase the electric demand charge (subsequently explained), for example, on night cycle, while the evaporator which serves the water chiller 110 operates when it is needed, day or night.

Outside air can be directed through or by-passed around an indirect evaporative cooler 111, as indicated by arrows 112 and 113, before it is conditioned in the air handler 102 and distributed through risers (not illustrated) and the ducts 103 to the building. In the air handlers 102, air is conditioned by contact with coils 114 to a dry bulb temperature of substantially 42° F. (6° C.). Ice water from the ice storage tank 109 at, say, 38° F. (3° C.) is circulated by pumps 115, flowing through a line 116, the pumps 115, a line 117, the coil 114 and a line 118 back to the tank 109. The flow of ice water through the coil 114 is modulated to maintain the 42° F. (6° C.) temperature of the conditioned air leaving the air handler 102. Whenever the ambient air has a low moisture content, it is economically desirable to use the indirect evaporative cooler 111 and, thereby, to reduce the requirement for ice water to remove heat from the coil 114.

Conditioned air from the ducts 103 is delivered to the induction mixing units 104 at a rate which varies, depending upon the settings of individual dampers 119, each of which is actuated by a humidistat-thermostat sensor controller 120. The induction mixing units 104 are of the "fan/coil" type, having constant speed fans 121 and coils 122. The fans 122 have a capacity greater than the maximum flow of conditioned air to the induction mixing units 104 when the dampers 119 are in their full open positions; as a consequence, air is caused to flow from a space served thereby into each of the induction mixing units, mixing with conditioned air, and being returned to the space from the fan discharge mixed with conditioned air. The spaces served by the induction mixing units 104 are below, while the units 104 are above, ceilings 123. The air flow described above is indicated in FIG. 9 by an arrow having a head 124 which represents the flow of a mixture of conditioned air and recirculated air from the induction box 104 and a tail 125 which represents the flow of air from the space into the unit 104.

Chilled water flows through the coils 122, being circulated by pumps 126 through a line 127, the water chiller 110, a line 128, a main header 129, a supply line 130, a header 131 of a first sprinkler grid, one of several sprinkler conduits 132 of the first sprinkler grid, a supply line 133, the coils 122, a return line 134, one of several sprinkler conduits 135 of a second sprinkler grid, a header 136 of the second sprinkler grid, a return line 137, a main return 138 and a line 139 back to the pumps 126. The chilled water circulated through the coils 122 is at a comparatively high temperature, sufficiently high that moisture is not condensed when room air at design conditions flows over the coils 122. In a typical instance, the water in the coils 122 will be at 58° F. (14° C.), and the room air will be at 75° F. (24° C.) and 50% relative humidity. The capacity of each of the fans 121 is such that, when the air conditioning load is at the maximum design load, the associated damper 119 is in its full open position, and chilled water is flowing through the associated coil 122 at its maximum rate (as subsequently discussed in more detail), from 40 to 60% of the air conditioning load is carried by conditioned air and the rest of the load is carried by the coil 122. It has been found that, when the apparatus has these design parameters, significant savings are possible because the sizes of the ducts and blowers required to circulate conditioned air can be minimized. In a typical installation, the savings which can be realized by minimizing duct and blower sizes are nearly sufficient to offset the extra cost of the induction mixing units 104 and of the refrigeration apparatus, including the compressor 107, which apparatus has the capability of making and storing ice and of providing chilled water when needed.

The operation of the induction mixing units 104 served by the ducts 103 is controlled by the humidistat-thermostat controllers 120. When the air conditioning load is the maximum design load, and humidity control has been established, in a space served by a given one of the units 104, that unit operates as just described, with the associated damper 119 in its full open position, and chilled water flowing through the associated coil 122 at the maximum rate (because a valve 140 is in its full open position). As the load on that space decreases below the maximum design load, the valve 140 remains in its full open position, in a preferred mode of operation when humidity control has been establish, while the damper 119 is modulated by the humidistat-thermostat controller 120 to reduce the flow of cold air from the duct 103 as required for temperature control. Whenever the sensible load on the space served by one of the induction mixing units 104 is sufficiently low that the minimum flow of conditioned air required for ventilation maintains humidity control and causes over cooling, the valve 140 serving that unit is modulated by the associated controller 120 as required to maintain a desired space temperature by control of the flow of chilled water through the associated coil 122. Whenever the humidistat-thermostat controllers 120 sense a humidity above that which they are set to maintain, they close the associated valves 140 and open the associated dampers 119 until humidity control is established or re-established, and then continue operation as described above.

Ordinarily, it is necessary to maintain some minimum flow of ventilation air into the space being conditioned; as a consequence, the minimum setting for each of the dampers 119 is that setting which provides the minimum ventilation air, usually 0.10 to 0.15 cubic foot per minute per square foot of space served by a given one of the induction mixing units 104. Accordingly, the system is designed for a minimum air conditioning load which can be accommodated by air from the duct 103 being delivered to the space at the minimum rate required for ventilation unless some expedient that is not illustrated in FIG. 10 is used to add heat to the air delivered by at least some of the induction mixing units 104. Heat can be added, for example, by unitary heat pumps (not illustrated), or by circulating warm water through a second circulating system (not illustrated) to all or some of the coils 122 in the apparatus of FIG. 10.

The induction mixing units 104 can also be operated by modulating the dampers 119 for temperature control, with the valves 140 remaining fully closed, so long as primary air from the duct 103 can maintain the set temperature, and by modulating the valves 140 for temperature control only when the dampers 119 are fully oepn and more cooling is required. This mode of operation is usually less desirable, however, because of the likelihood of over cooling and the consequent waste of energy.

As has been stated above, the refrigeration apparatus includes the compressor 107, the evaporative condenser 108, and two different evaporators, one which serves the ice storage tank 109 and one which serves the water chiller 110. On day cycle, the ice storage tank 109 contains a supply of ice sufficient to provide all the chilled water required by the coil 114 until the evaporator which serves the ice storage tank 109 is again operated. Only the evaporator which serves the water chiller 110 is operated on day cycle, the refrigerant flow being from the compressor 107 through a line 141, the evaporative condenser 108, a line 142, a high pressure receiver 143, a line 144, a low pressure receiver 145, a line 146, a line 147, the water chiller 110, lines 148 and 149, the low pressure receiver 145 and a line 150 to the suction side of the compressor 107. The evaporator which serves the water chiler 110 is controlled to maintain the required chilled water temperature in the coils 122 of the induction mixing units 104.

The refrigeration apparatus is also operated when the water chiller 110 is idle, but to produce ice. The refrigerant flow is from the compressor 107 through the line 141, the evaporative condenser 108, the line 142, the high pressure receiver 143, the line 144, the low pressure receiver 145, the line 146, a line 151, the ice storage tank 109, a line 152, the line 149, the low pressure receiver 145 and the line 150 to the suction side of the compressor 107. Enough ice is produced while the water chiller 110 is idle to provide all the chilled water required by the coils 114 during the next period of operation of the water chiller 110.

The portion of the apparatus of FIG. 10 that is served by the air handler 102, the ducts 103, the compressor 107, the ice storage tank 109 and the water chiller 110 is highly advantageous from the standpoint of the cost of energy (electricity) required for operation. It was originally designed to service an addition to a shopping mall which had an air conditioning system in which a mixture of ambient air and return air was cooled to a dry bulb temperature of 55° F. (13° C.), and the cooled air was circulated as required for air conditioning. It is by comparison with the existing system that, as stated above, the savings which can be realized by minimizing duct and blower sizes are sufficient to offset the extra cost of the induction mixing units 104 and a substantial portion of the cost of the refrigeration apparatus, including the compressor 107, which apparatus has the capability of making and storing ice and of providing chilled water. In the existing mall, the energy costs are divided about equally between the requirements for lighting and the requirements of the HVAC system. A "demand" charge, which is a flat monthly fee based upon the maximum rate of energy usage, is a substantial part of the energy costs for the HVAC system; the demand charge, of course, reflects the high cost of new generating equipment, which makes it highly desirable for a utility, for the country, to keep the maximum rate at which electricity is used as low as possible. The apparatus of FIG. 10 makes ice when there is no demand charge (because the usage of energy by the shopping mall, by the community served by the utility, is low), and then uses that ice during the day to carry about one-half of the peak air conditioning load. While the refrigeration apparatus operates during the time when the electricity it uses contributes to the demand charge, its energy requirements during this time are less than half of the total requirements of the HVAC system. It has been estimated that one-half of the cost of energy required by the HVAC system can be saved by using the FIG. 9 apparatus instead of duplicating the existing equipment.

The apparatus of FIG. 10 also includes a cooling tower 156 and a pump 157 for circulating tower water from the cooling tower 156 through a line 158, through a plate and frame heat exchanger 159, and through a line 160 back to the cooling tower 156. Whenever the ambient humidity is sufficiently low to make it worth while, the tower 156 can be operated, and cooled water can be circulated therefrom to the heat exchanger 159 as just described for heat transfer with heat transfer fluid discharged from the pumps 126 and diverted by a three-way valve 161 to flow through a line 162, the heat exchanger 159, a line 163, a plate and frame heat exchanger 164 and a line 165 before entering the line 127 for flow to the water chiller 110 and to the coils 122 as previously described. If the water from the tower 156 is sufficiently cold, it is not necessary to operate the water chiller 110; if not, reduced operation is sufficient. The apparatus also includes a three-way valve 166 which can be used to divert heat transfer fluid in the line 118 (returning to the ice storage tank 109 from the coil 114) for flow through a line 167, through the heat exchanger 164 and through a line 168 back to the line 118 for return to the ice storage tank 109. When heat transfer fluid is diverted to flow through the heat exchanger 164, as just described, the valve 161 and a valve 169 can be used to divert the flow of heat transfer fluid discharged by the pumps 126 directly into the heat exchanger 164 for heat transfer to the fluid diverted from the line 118 and flow through the lines 165 and 127 to the water chiller 110. Such operation may be advantageous whenever the ice in the ice storage tank 109 has excess heat absorbing capacity, beyond that required by the coil 114 to provide air at 42° F. (6° C.) for the rest of the day of operation. Heat exchange between the two fluids, as described, reduces the requirement for refrigeration to provide water at 58° F. (14° C.) to serve the coils 122, and may eliminate that requirement altogether if the ice has sufficient excess capacity.

The apparatus of FIG. 10 also includes a heat recovery unit 170 which can be used on night cycle to provide warm heat transfer fluid, as required, for circulation to the coils 122. This is done by closing a valve 171 at least partially so that warm refrigerant from the compressor 107 flows from the line 141 through a line 172 to the unit 170, leaving the unit 170 through a line 173 and either flowing through a line 174 back into the line 141 or flowing directly into the line 142. In either event, there is warm refrigerant in the unit 170 from which heat can be transferred to the fluid circulated by the pumps 126. This is done by setting a valve 175 to divert heat transfer fluid discharged by the pumps 126 for flow through a line 176 to the unit 170. After heat has been transferred thereto from the refrigerant in the unit 170, the fluid flows through a line 177 to the main header 129 and then through whichever ones of the coils 122 require heat and back to the pumps 126 as previously described.

A humidistat 178 in a duct 179 can also be used to control the apparatus of FIGS. 9 and 10. Return air from the building served by the apparatus flows through the duct 179 (FIG. 10) to the air handler 102; its humidity, so long as there are not large differences in humidity from space to space in the building, is representative of the humidity of the entire building. Accordingly, a controller 180 which is responsive to a signal from the humidistat 178 can be used to control the pumps 126, preventing their operation except when the signal indicates that humidity control has been established in the building. The humidistat-thermostat controllers 120 can then be replaced by thermostat controllers (not illustrated), which modulate the valves 140 for temperature control until a full open position is reached, and then modulate the dampers 119 for temperature control.

The apparatus of FIGS. 9 and 10 also includes a gas engine-generator 181 (FIG. 9), which generates electricity, as indicated by arrows 182 and 183 and serves as a heat source for absorption refrigeration apparatus indicated generally at 184 and for heat exchangers 185 and 186. Electricity from the generator 181 can serve the pumps and motors of the apparatus, or it can be introduced into the building grid (not illustrated). Heat from both the exhaust gases and the jacket water from the engine-generator 181 can be transferred to the absorption refrigeration apparatus 184. The exhaust gases are discharged from the engine generator 181 through a stack 187, and are vented through a discharge 188, directed through a branch line 189 into heat exchange relationship with the absorption refrigeration apparatus 184, or directed through a branch 190 into the heat exchanger 185, depending upon the settings of dampers 191, 192 and 193. Exhaust gases which are directed through the branch line 189, after having furnished heat to energize the apparatus 184, flow into and are vented from a stack 194, while gases which are directed through the branch 190, after having furnished heat to the heat exchanger 185, flow into and are vented from a stack 195. Jacket water is circulated from the engine-generator 181 through a line 196 to the heat exchanger 186 and back through a line 197. On summer cycle, when chilled water from the absorption refrigeration apparatus 184 is required, a heat transfer fluid is circulated from the heat exchanger 186 through a line 198 to a heat exchange jacket 199 of the apparatus 184, and through a line 200 back to the heat exchanger 186, providing energy for the apparatus 184.

A valve 201 can be set so that the heat transfer fluid from the heat exchanger 186 flows through a line 202, to a sheet and tube heat exchanger 203 (FIG. 10), returning through a line 204. A valve 205 is modulated, as required, to maintain a desired temperature; in one position, the valve 205 causes circulated the heat exchange fluid to flow through the heat exchanger 203 while, in the other, it causes the fluid to flow through a line 206, bypassing the exchanger 203. Heat transfer fluid flowing through the exchanger 203 heats another heat transfer fluid, for example ethylene glycol, which is circulated from the heat exchanger 203 through a line 207, a coil 208 in the air handler 102, and a line 209 back to the exchanger 203.

When the gas engine generator 181 is operating and the apparatus of FIGS. 9 and 10 is being used on summer cycle to air condition a building, valves 210 and 211 (FIG. 9) are open, a valve 212 is closed, and a valve 213 (FIG. 10) and the valves 161 and 175 are set so that heat transfer fluid discharged from the pumps 126 is directed into the line 129, flows through the absorption apparatus 184 (FIG. 9), and is cooled before flowing through the lines 30, 31 and 32, the valves 36, 37 and 38, in heat transfer relationship with the condensers 22, 23 and 24, through the lines 33, 34 and 35 and the check valves 39, 40 and 41, as previously described, and then into the main return 138 and back to the pumps 126 (FIG. 10). In this mode of operation, there is no need for the compressor 107 to operate, as the chilled water required for the coils 122 is provided by the absorption refrigeration apparatus 184 (FIG. 9), supplemented, if required, by heat transfer from the heat transfer fluid in the heat exchanger 164 (FIG. 10) as previously described. Heat from the absorber and condenser (not illustrated) of the apparatus 184 (FIG. 9) can be transferred to the cooling tower 156 (FIG. 10).

The dehumidifier 105 (FIG. 9) of the apparatus of FIGS. 9 and 10 is associated with a regenerator 214, a storage tank 215 and heat exchangers, pumps and sumps as subsequently described in more detail. Ambient air enters the apparatus through a preheater 216 as indicated by an arrow, and is discharged by a blower 217, flowing therefrom through a line 218 and into the conditioner 105 where it is dehumidified by contact with a lithium chloride solution which is discharged from sprays 219 over a contactor 220. Heat of sorption is removed from the contactor 220 by cooling tower water or chilled water circulated therethrough as subsequently described in more detail.

Dehumidified air flows from the conditioner 105 through the duct 106 to air bars 221 (one of which is shown in FIG. 9) and to a plurality of the induction mixing units 104 (one of which is shown in FIG. 9). The induction mixing units 104 served by the duct 106 and their operation are identical with those served by the duct 103 and their operation, except that pumps 222 circulate a heat transfer fluid to valves 223 and 224 which direct it either through the heat recovery unit 170 and the line 177 to the main header 129 or through the water chiller 110, the line 128, and a line 225 to the main header 129.

A hygroscopic solution, preferably aqueous lithium chloride, is circulated from a sump 226 (FIG. 9) by a pump 227 through a line 228 to the sprays 219 and through a line 229 to a heat exchanger 230. The hygroscopic liquid from the sprays 219 flows over the contactor 220, dehumidifying air circulated through the conditioner 105 as previously described, and then flows from the bottom of the conditioner 105 through a line 231 back to the sump 226. Hygroscopic liquid from the line 229 flows through one side of the heat exchanger 230 and a line 232 to the storage tank 215, while a pump 233 circulates hygroscopic liquid from the storage tank 215 through a line 234, the other side of the heat exchanger 230 and a line 235 to the sump 226. The rates of flow to and from the sump 226 are correlated to maintain a constant liquid level therein. Heat of sorption, when the outside humidity is sufficiently low, is transferred to water circulated from a cooling tower 236 by a pump 237 through a line 238, a line 239, the contactor 220 and lines 240 and 241 back to the cooling tower 236. When the outside humidity is too high, the heat of sorption is transferred to chilled water from the line 129 which flows through a line 242 to the line 240 and the contactor 220, returning through the line 239 and a line 243 to the line 138.

The storage tank 215 can contain an aqueous solution having a nominal content of 42 to 44 weight percent of lithium chloride, and the engine generator 181 can operate continuously to provide the heat necessary for regeneration to maintain this concentration. Alternatively, the engine generator 181 can operate only during the day; electricity from a utility can be used at night to make ice and to operate the water chiller 110; and regeneration can be discontinued at night so that, as operation proceeds during the course of the night the solution in the tank 215 is gradually diluted by moisture removed from air in the conditioner 105. The lithium chloride concentration may be as low as 37 to 39 percent by weight before day operation is again resumed and the concentration increased to the nominal 42 to 44 weight percent. In this alternative option, the temperature of the contactor 220 can be reduced, as necessary, to compensate for the decrease in lithium chloride concentration. As a second option, the engine generator 181 can operate only during the day, regeneration can occur only at night, and heat from the heat exchanger 185 can be used to heat water in a storage tank (not illustrated), while the compressor 107 (FIG. 10) is operated at night, as required. In this second option, a heat pump (not illustrated) can be used during night operation to pump heat from the storage tank to a heat exchanger 244 (FIG. 9) as required for regeneration as subsequently described.

The heat exchanger 185 serves as a heat source for regeneration of desiccant in the storage tank 215. A heat transfer fluid is circulated from the heat exchanger 185 to the heat exchanger 244, and back to the heat exchanger 185 whenever the gas engine-generator 181 is operating, while lithium chloride solution to be regenerated is circulated through the heat exchanger 244 and then to sprays 245 in the regenerator 214. A pump 246 causes the lithium chloride solution to flow from the tank 215 through a line 247, one side of a heat exchanger 248 and a line 249 to a sump 250. A pump 251 causes lithium chloride solution to flow from the sump 250 through a line 252 to the heat exchanger 244 and from thence through a line 253 to the sprays 245. Lithium chloride solution discharged from the sprays 245 flows over a contactor 254 and from the bottom of the regenerator 214 through a line 255 to the sump 250. A portion of the lithium chloride solution flowing through the line 252 is diverted to a line 256 from which it flows through the heat exchanger 248 and a line 257 back to the storage tank 215.

Lithium chloride solution flowing over the contactor 254 in the regenerator 214 is in contact with air which flows through a line 258, a heat exchanger 259 and a line 260 into the regenerator 214, from which it is withdrawn by a blower 261; air discharged from the blower 261 flows through a line 262 and the heat exchanger 259 into a line 263 from which it is vented.

Regeneration of the lithium chloride solution stored in the tank 215 is the sme (in the sense that dilute solution is heated in the heat exchanger 244, and circulated as described) in all three of the options discussed above, i.e., (1) where the engine generator 181 runs and regeneration occurs continuously; (2) where the engine generator 181 runs and regeneration occurs only during the day; and (3) where the engine generator 181 runs only during the day and heat from the heat exchanger 185 is transferred to water in a storage tank (not illustrated) and stored until night, at which time a heat pump (not illustrated) is used to pump the heat required for regeneration from water in the tank. When a heat pump is used in connection with night time regeneration, a heat transfer fluid can be circulated to the condensers 22, 23 and 24, and heat can be pumped from the fluid to the heat exchanger 244 to provide the heat required for regeneration, any excess heat being transferred from the fluid in the evaporative cooler 236 or in the evaporative cooler 156 (FIG. 10). Further, the heat pump can be used to pump heat from desiccant in the tank 215 (FIG. 9) or from desiccant flowing over the contactor 220 to the heat exchanger 244 to provide the heat necessary for regeneration. When a heat pump is used on night cycle to provide the heat needed for regeneration, it is usually preferred that the pump be driven by electricity purchased from a utility, and used when the consumption of electricity does not contribute to a demand charge.

The air bar 221 can be of the kind shown in FIG. 5 of U.S. Patent No. 4,276,817, granted July 7, 1981 to Gershon Meckler, where conditioned air discharged from a duct flows through nozzles and induces air from outside the bar to flow into a channel below the duct for mixture and delivery with the conditioned air, or it can be a conventional air bar where the discharge of conditioned air does not induce outside air to flow into the channel. It can also be an assembly of an induction mixing unit where induction is caused either by nozzles or by a fan with an air bar which does not induce air from outside the bar to flow into the channel below the duct; such an assembly is shown in FIG. 6 of said Meckler patent.

A float 264 in the storage tank 215 can signal that regeneration is complete, either furnishing a visible signal or activating a mechanism (not illustrated) which interrupts the regenerating part of the operation.

Heat exchangers 265, 266, 267 and 268 can be used to transfer heat to or from the desiccant in the storage tank 215. For example, the heat exchanger 266 is operably connected to receive either water that has been cooled in the evaporative cooler 236 or chilled water from the line 129. Similarly, an electric heating element 269 positioned in the tank 215 can be used to add heat to the desiccant.

Figure 11:
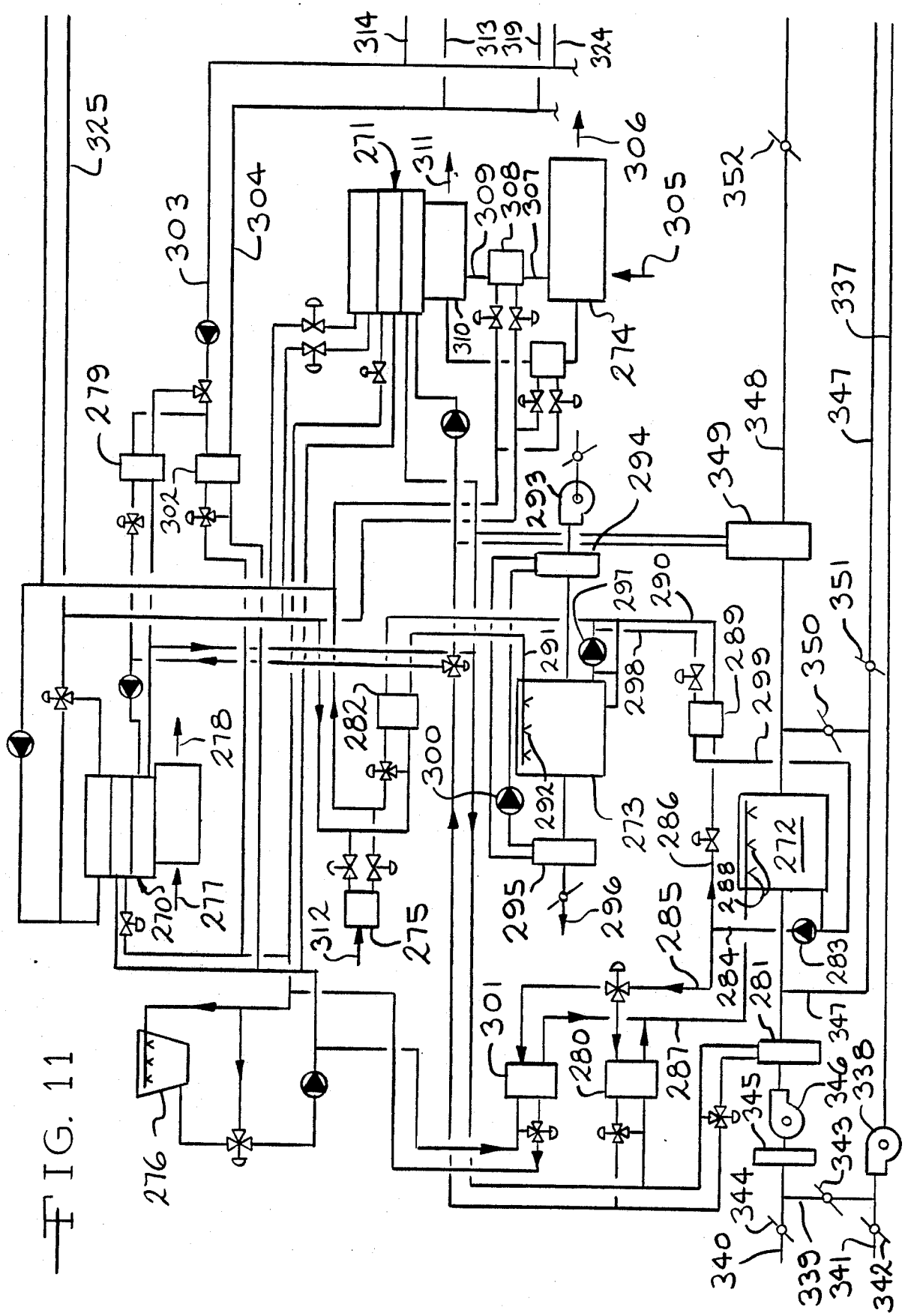
FIGS. 11 and 12, together, constitute a schematic diagram of still another embodiment of apparatus according to the invention.
Figure 12:
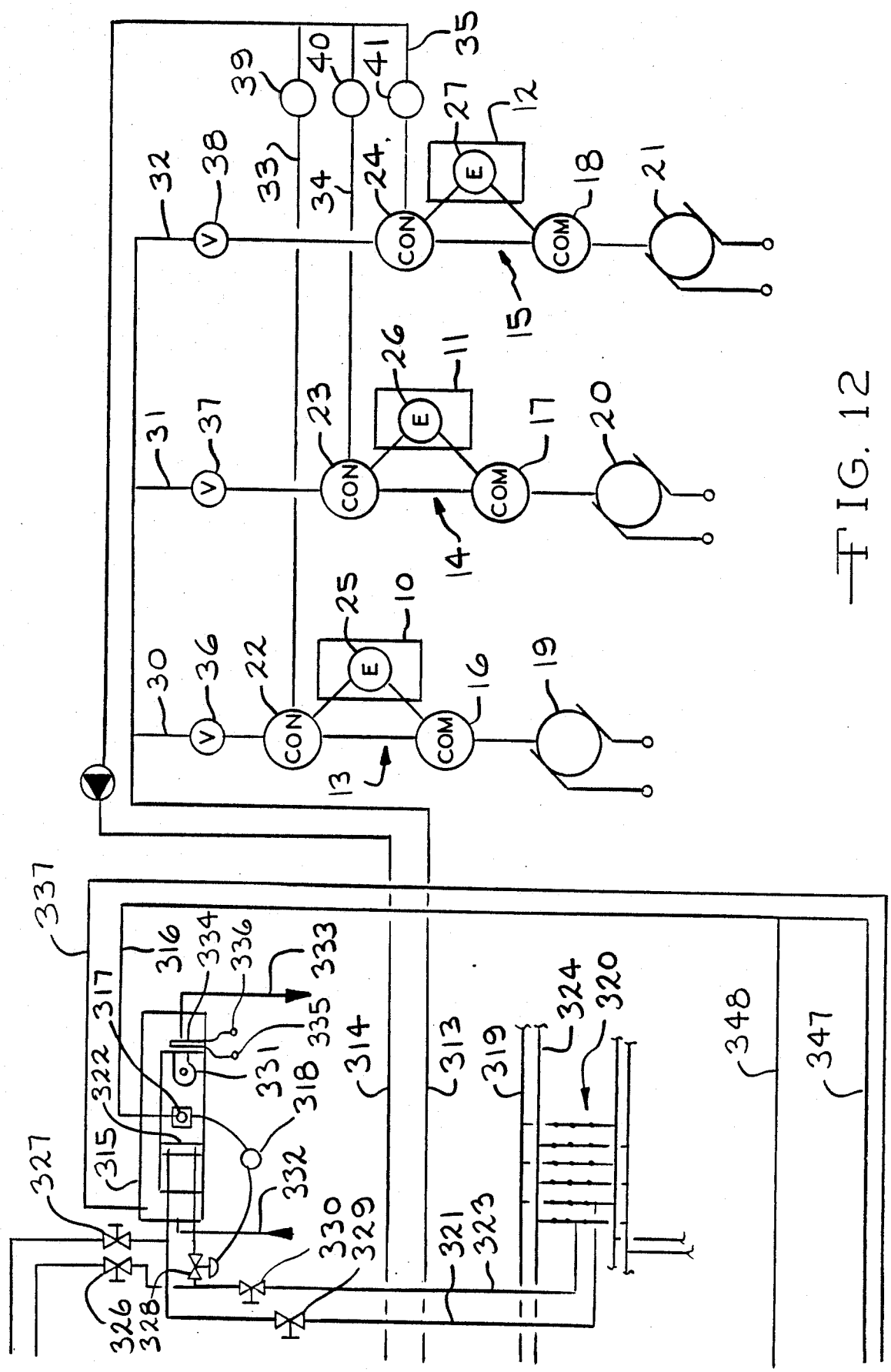

Referring now to FIGS. 11 and 12, apparatus is shown which comprises direct fired absorption refrigeration/ heating apparatus 270 (FIG. 11), absorption refrigeration/heating apparatus 271, dehumidification apparatus comprising a dehumidifier 272 and a regenerator 273, a gas engine-generator 274, a boiler 275, an evaporative cooler 276, a plurality of the induction mixing units 104 (one of which is shown in FIG. 12) and the refrigerated cases 10, 11 and 12 the compression refrigeration apparatus 13, 14 and 15 and associated apparatus. The absorption apparatus 270 (FIG. 11), which is fired by gas or other fuel, as indicated by an arrow 277, and discharges combustion products as indicated by an arrow 278, chills water which is circulated to heat exchangers 279, 280 and 281 and heats water which is circulated to a heat exchanger 282.

The heat exchanger 282 serves the regenerator 273 by providing heat for regeneration of the desiccant therein. While the heat exchanger 280 serves the dehumidifier 272 by transferring heat from desiccant that is used therein. A pump 283 causes desiccant solution to flow in a line 284 and in two lines 285 and 286. Desiccant in the line 285 flows through the heat exchanger 280 where it is cooled by heat transfer to cold water from the absorption apparatus 270 before flowing through a line 287 and being sprayed from nozzles 288 in the dehumidifier 272. Desiccant in the line 286 flows through a heat exchanger 289 and a line 290 to the heat exchanger 282 where it is heated by heat transfer from heated water from the absorption apparatus 270 before flowing through a line 291 and being sprayed from nozzles 292 in the regenerator 273. Hot desiccant sprayed in the regenerator 273 comes into contact with heated air which a blower 293 discharges through a heat exchanger 294, through the regenerator 273, through a heat exchanger 295 and from the apparatus as indicated by an arrow 296. A pump 297 causes some of the desiccant which flows from the bottom of the regenerator 273 to flow back to the heat exchanger 282 and some to return through a line 298, the heat exchanger 289 and a line 299 to the pump 283. A pump 300 circulates a heat transfer fluid between the two heat exchangers 294 and 295 so that heat is transferred to the fluid in the exchanger 295 and is transferred from the fluid to air in the exchanger 294. As a consequence, desiccant solution that is heated in the heat exchanger 282 and sprayed from the nozzles 292 contacts heated air and is regenerated in the regenerator 273.

The cooling tower 276 serves the absorption apparatus 270 and the absorption apparatus 271 by rejecting heat therefrom, as required, and also serves heat exchangers 301 and 302, whenever outside conditions are such that it is possible, by rejecting heat therefrom to maintain the desiccant that is sprayed in the dehumidifier 272 at the required temperature and to maintain the required temperature in lines 303 and 304.

The absorption apparatus 271 is connected in parallel with the apparatus 270, serving all the same heat exchangers. It is energized by exhaust gases from the gas engine generator 274, which can be sized to provide all of the electricity required by the pumps, blowers and motors so that the apparatus does not contribute to an electric demand charge, being on all gas unit so far as energy input is concerned. Gas enters the engine generator 274 as indicated by an arrow 305. An arrow 306 represents electricity that is generated, and can be fed into the building grid (not illustrated) or can be supplied directly to the motors, blowers and pumps.

Combustion products leave the engine generator 274 through a line 307, and flow through a heat exchanger 308 and a line 309 into the energy input section 310 of the absorption apparatus 271, ultimately being exhausted as indicated by an arrow 311.

The boiler 275 is direct fired, as indicated by an arrow 312, which represents the entry of gas fuel thereinto. The boiler 275 and the heat exchanger 308 are connected in parallel with the hot water portions of the absorption refrigeration apparatus 270 and 271 to supply heat to the heat exchanger 282 for transfer as described to desiccant that is to be regenerated.

In operation, the apparatus of FIGS. 11 and 12 furnishes conditioned air and warmed or cooled heat transfer fluid to a plurality of the induction mixing units 315 (one of which is shown in FIG. 12), and to the refrigeration apparatus 13, 14 and 15. A heat transfer fluid which has been cooled in the heat exchanger 279 (FIG. 11) or in the heat exchanger 302 is circulated through the line 204 to a line 313 from which it serves the refrigeration apparatus 13, 14 and 15 (FIG. 12), as previously described, flowing into a line 314 and back to the line 303 (FIG. 11). The operation of the induction mixing units 315 (FIG. 12) is substantially the same as that of the units 104, as previously described. Conditioned air, produced as subsequently explained, is delivered to each of the units from a duct 316 at a rate which is controlled by a damper 317 actuated by a humidistat-thermostat controller 318 to maintain a desired humidity, usually less than 50 grains of water vapor per pound of dry air. Chilled water, when cooling is required, is furnished to the units 315, flowing through the line 304 (FIG. 11), a line 319 (FIG. 12), a conduit of a sprinkler grid indicated generally at 320, and a line 321 to a coil 322, and returning through a line 323, a conduit of the sprinkler grid 320, a line 324 and the line 303 (FIG. 11).

Heated water from a line 325 is also available to the coils 322 (FIG. 12) of the induction mixing units 315. So long as cooling is required, valves 326 and 327 remain closed, and the humidistat-thermostat controller 318 modulates a valve 328 as required for temperature control. When the valve 328 is fully closed and too low a temperature is sensed, valves 329 and 330 are closed; the valves 326 and 327 are opened; and the humidistat-thermostat controller 318 modulates the valve 328 as required to provide the heating needed for temperature control.

The induction mixing units 315 have blowers 331 which induce space air to flow as indicated by an arrow tail 332 and which discharge a mixture of space air and conditioned air as indicated by an arrow head 333. The mixture of space air and conditioned air discharged from the blowers 331 flows over resistance heaters 334 which have electrical connections 335 and 336 through which the heaters can be energized as required for supplemental heating by the electrical system of the building (not illustrated). The operation of the heaters 334 can be controlled by the humidistat-thermostat controllers 318.

Relief air leaves the space served by each of the induction mixing units through a duct 337 and enters the suction side of a blower 338 (FIG. 11) from which a part can flow through a duct 339 for mixture with outside air entering the apparatus through a duct 340 or all or a part can be vented through a duct 341, depending on the positions of dampers 342, 343 and 344. Outside air or a mixture of outside air and return air flows through a filter 345 and a blower 346 from which it flows in heat transfer relationship with the heat exchanger 281 and then into a duct 347 or 348. Air which enters the duct 348 flows through the dehumidifier 272 and through a heat exchanger 349, which is operably connected to receive chilled water from the absorption refrigeration apparatus 270, 271, or both, while air which enters the duct 347 by passes the dehumidifier 272 or the dehumidifier 272 and the heat exchanger 349, depending upon the positions of dampers 350, 351 and 352. It is air from the duct 347, air from the duct 348, or a mixture of the two that is delivered to the induction mixing units 315 (FIG. 12) from the duct 337.

The apparatus of FIGS. 1 through 12 is energy efficient:

(a) because condensation and consequent energy losses of the coils of the refrigerated cases 10, 11 and 12 is minimized, and (b) because the use of chilled water to remove heat therefrom makes the refrigeration apparatus 13, 14 and 15 more energy efficient.

The apparatus of FIGS. 9–12 is additionally efficient because it uses ice making apparatus which operates at night, absorption apparatus which uses gas as an energy source, gas engine generating apparatus, or a combination of two or three of the foregoing to minimize or eliminate the use of electricity from a utility at times when such use would contribute to a demand charge.

It will be appreciated that various changes and modifications can be made from the specific details of the invention as shown in the attached drawings and described with reference thereto without departing from the spirit and scope thereof as defined in the appended claims. For example, lithium chloride solutions have been described as aqueous desiccants, but other solutions are also operable, for example other lithium halides, calcium chloride, and even glycol solutions. In one aspect, the invention enables the conservation of energy by intermittent use of a regenerator and of a conditioner, the latter operating as a dehumidifier. Another important aspect of the invention involves the use of air conditioning apparatus to perform one function on day cycle and a different function on night cycle, one function during winter operation and a different function during summer operation, and minimizing the size of equipment required by storing what is made during one mode of operation for use at a different time in a different mode of operation. For example, desiccant solution can be concentrated and ice can be produced on night cycle, and both the concentrated desiccant solution and the ice can be used on day cycle to minimize energy requirements and to enable a given air conditioning job to be performed with smaller equipment than would otherwise be required.

The cogenerator can be a diesel or Otto cycle, as well as a gas turbine (Brayton Cycle). A Stirling engine can also be used, with its shaft coupled directly to an electric generator or to a second Stirling engine, which then acts as a heat pump.

I claim:

1. Apparatus for conditioning the air of a closed space and for removing heat from a refrigerated display case therein, said apparatus comprising, in combination, first refrigeration apparatus which comprises a heat rejecting section, a compressor, and a heat absorbing section operatively associated to transfer heat from the refrigerated case, second refrigeration apparatus which includes a heat absorbing section and a heat rejecting section, a chemical dehumidifier which uses a desiccant, a regenerator for said dehumidifier, means for transferring heat from the heat rejecting section of said second refrigeration apparatus, from the conversion of a fuel into heat, or from both to said regenerator to enable regeneration of the desiccant of said dehumidifier, means for transferring heat from the condenser of said first refrigeration apparatus to the heat absorbing section of said second refrigeration apparatus, and means for causing air to flow in dehumidifying relationship with said dehumidifier and then into said space, said apparatus being operable to maintain the temperature of the case below that of the closed space and to deliver dehumidified air to the space to maintain a humidity ration in the closed space below about 50 grains of moisture per pound of dry air.

2. Apparatus as claimed in claim 1 wherein the desiccant of said dehumidifier is an aqueous liquid desiccant, and which additionally includes means for transferring heat from the liquid desiccant.

3. Apparatus as claimed in claim 2 wherein said means for causing air to flow in dehumidifying relationship with said dehumidifier and then into said space additionally includes means for transferring heat from the air after it is discharged from said dehumidifier and before it is delivered to said space.

4. Apparatus as claimed in claim 2 wherein said means for causing air to flow in dehumidifying relationship with said dehumidifier and then into said space additionally includes means for transferring heat from the air before it flows in dehumidifying relationship with said dehumidifier 5. Apparatus as claimed in claim 4 which additionally includes means for transferring heat to or from said space.

6. Apparatus as claimed in claim 5 wherein said means for transferring heat to said regenerator is operable to transfer heat thereto from means for converting a fuel into electricity and heat.

7. Apparatus as claimed in claim 6 wherein said means for converting a fuel into electricity and heat includes an internal combustion engine.

8. Apparatus as claimed in claim 6 wherein said means for converting a fuel into electricity and heat includes a Stirling engine.

9. Apparatus as claimed in claim 6 wherein said means for converting a fuel into electricity and heat includes a fuel cell.

10. Apparatus as claimed in claim 5 wherein said second refrigeration apparatus is of the direct-fired absorption type where heat from the combustion of a fuel provides the energy required by the apparatus.

11. Apparatus as claimed in claim 10 wherein said means for transferring heat to the regenerator of said dehumidifier is operable to transfer heat thereto from the combustion of a fuel by the direct-fired absorption refrigeration apparatus.

12. Apparatus as claimed in claim 5 wherein said second refrigeration apparatus is absorption apparatus, and which includes means for converting a fuel into electricity and heat which is operable to transfer heat thereto to energize said second refrigeration apparatus.

13. Apparatus as claimed in claim 12 wherein said means for converting a fuel into electricity and heat includes an internal combustion engine.

14. Apparatus as claimed in claim 12 wherein said means for converting a fuel into electricity and heat includes a Stirling engine.

15. Apparatus as claimed in claim 12 wherein said means for converting a fuel into electricity and heat includes a fuel cell.

16. Apparatus as claimed in claim 5 wherein said second refrigeration apparatus is operable to make and store ice, and said means for transferring heat from the condenser of said first refrigeration apparatus is operable to transfer the heat first to ice that has been made and then stored, and then to the heat absorbing section of said second refrigeration apparatus.

17. Apparatus as claimed in claim 1 wherein said dehumidifier is one which supports a desiccant through which, alternately, air to be dehumidified and regenerating air flow in contact with the desiccant, and wherein said means for causing air to flow in dehumidifying relationship with said dehumidifier and then into said space additionally includes means for transferring heat from the air before it flows in dehumidifying relationship with said dehumidifier.

18. Apparatus as claimed in claim 1 wherein said means for causing air to flow in dehumidifying relationship with said dehumidifier and then into said space additionally includes means for transferring heat from air after it is discharged from said dehumidifier and before it is delivered to said space.

19. Apparatus as claimed in claim 18 which additionally includes means for transferring heat to or from said space.

20. Apparatus as claimed in claim 19 wherein said means for transferring heat to said regenerator is operable to transfer heat thereto from the heat rejecting section of said second refrigeration apparatus.

21. Apparatus as claimed in claim 19 wherein said means for transferring heat to said regenerator is operable to transfer heat thereto from means for converting a fuel into electricity and heat.

22. Apparatus as claimed in claim 21 wherein said means for converting a fuel into electricity and heat includes an internal combustion engine.

23. Apparatus as claimed in claim 21 wherein said means for converting a fuel into electricity and heat includes a Stirling engine.

24. Apparatus as claimed in claim 21 wherein said means for converting a fuel into electricity and heat includes a fuel cell.

25. Apparatus as claimed in claim 19 wherein said second refrigeration apparatus is of the direct-fired absorption type where heat from the combustion of a fuel provides the energy required by the apparatus.

26. Apparatus as claimed in claim 25 wherein said means for transferring heat to the regenerator of said dehumidifier is operable to transfer heat thereto from the combustion of a fuel by the direct-fired absorption refrigeration apparatus.

27. Apparatus as claimed in claim 19 wherein said second refrigeration apparatus is absorption apparatus, and which includes means for converting a fuel into electricity and heat which is operable to transfer heat thereto to energize said second refrigeration apparatus.

28. Apparatus as claimed in claim 27 wherein said means for converting a fuel into electricity and heat includes an internal combustion engine.

29. Apparatus as claimed in claim 27 wherein said means for converting a fuel into electricity and heat includes a Stirling engine.

30. Apparatus as claimed in claim 27 wherein said means for converting a fuel into electricity and heat includes a fuel cell.

31. Apparatus as claimed in claim 19 wherein said second refrigeration apparatus is operable to make and store ice, and said means for transferring heat from the condenser of said first refrigeration apparatus is operable to transfer the heat first to ice that has been made and then stored, and then to the heat absorbing section of said second refrigeration apparatus.

32. Apparatus as claimed in claim 5 wherein said means for transferring heat to or from said space is operable to transfer heat from said space to the heat absorbing section of said second refrigeration apparatus.

33. Apparatus as claimed in claim 2 wherein said means for transferring heat from the liquid desiccant is operable to transfer heat from the liquid desiccant to the heat absorbing section of said second refrigeration apparatus.

34. Apparatus as claimed in claim 17 wherein said means for transferring heat to or from the air before it flows in dehumidifying relationship with said dehumidifier is operable to transfer heat from the air to the heat absorbing section of said second refrigeration apparatus.

35. Apparatus as claimed in claim 1 wherein said dehumidifier is one which supports a desiccant through which, alternately, air to be dehumidified and regenerating air flow in contact with the desiccant, and wherein said means for causing air to flow in dehumidifying relationship with said dehumidifier and then into said space additionally includes means for transferring heat to the heat absorbing section of said second refrigeration apparatus:
  (a) from the air before it flows in dehumidifying relationship with said dehumidifier, and
  (b) from the air after it flows in dehumidifying relationship with said dehumidifier and before it flows into the space.

36. Apparatus as claimed in claim 2 wherein said means for causing air to flow in dehumidifying relationship with said dehumidifier and then into said space additionally includes means for transferring heat to the heat absorbing section of said second refrigeration apparatus from air after it is discharged from said dehumidifier and before it is delivered to said space.

37. Apparatus as claimed in claim 36 wherein said means for causing air to flow in dehumidifying relationship with said dehumidifier and then into said space additionally includes means for transferring heat to the heat absorbing section of said second refrigeration apparatus from the air before it flows in dehumidifying relationship with said dehumidifier.

38. Apparatus as claimed in claim 2 wherein said means for causing air to flow in dehumidifying relationship with said dehumidifier and then into space additionally includes means for transferring heat to the heat absorbing section of said second refrigeration apparatus from air before it flows in dehumidifying relationship with said dehumidifier.

39. Apparatus as claimed in claim 38 wherein said means for causing air to flow in dehumidifying relationship with said dehumidifier and then into said space additionally includes means for transferring heat to the heat absorbing section of said second refrigeration apparatus from the air after it is discharged from said dehumidifier and before it is delivered to said space.

40. Apparatus as claimed in claim 6 wherein said first refrigeration apparatus includes an electric motor operably connected in driving relationship with said compressor, and which additionally includes means operably connecting said means for converting a fuel into electricity and heat to supply electricity for said motor.

41. Apparatus as claimed in claim 21 wherein said first refrigeration apparatus includes an electric motor operably connected in driving relationship with said compressor, and which additionally includes means operably connecting said means for converting a fuel into electricity and heat to supply electricity for said motor.

42. Apparatus as claimed in claim 3 which additionally includes means for transferring heat to or from said space.

43. Apparatus as claimed in claim 42 wherein said means for transferring heat to said regenerator is operable to transfer heat thereto from the heat rejecting section of said second refrigeration apparatus.

44. Apparatus as claimed in claim 42 wherein said means for transferring heat to said regenerator is operable to transfer heat thereto from means for converting a fuel into electricity and heat.

45. Apparatus as claimed in claim 44 wherein said means for converting a fuel into electricity and heat includes an internal combustion engine.

46. Apparatus as claimed in claim 44 wherein said means for converting a fuel into electricity and heat includes a Stirling engine.

47. Apparatus as claimed in claim 44 wherein said means for converting a fuel into electricity and heat includes a fuel cell.

48. Apparatus as claimed in claim 42 wherein said second refrigeration apparatus is of the direct-fired absorption type where heat from the combustion of a fuel provides the energy required by the apparatus.

49. Apparatus as claimed in claim 48 wherein said means for transferring heat to the regenerator of said dehumidifier is operable to transfer heat thereto from the combustion of a fuel by the direct-fired absorption refrigeration apparatus.

50. Apparatus as claimed in claim 42 wherein said second refrigeration apparatus is absorption apparatus, and which includes means for converting a fuel into electricity and heat which is operable to transfer heat thereto to energize said second refrigeration apparatus.

51. Apparatus as claimed in claim 50 wherein said means for converting a fuel into electricity and heat includes an internal combustion engine.

52. Apparatus as claimed in claim 50 wherein said means for converting a fuel into electricity and heat includes a Stirling engine.

53. Apparatus as claimed in claim 50 wherein said means for converting a fuel into electricity and heat includes a fuel cell.

54. Apparatus as claimed in claim 42 wherein said second refrigeration apparatus is operable to make and store ice, and said means for transferring heat from the condenser of said first refrigeration apparatus is operable to transfer the heat first to ice that has been made and then stored, and then to the heat absorbing section of said second refrigeration apparatus.

55. Apparatus as claimed in claim 17 which additionally includes means for transferring heat to or from said space.

56. Apparatus as claimed in claim 55 wherein said means for transferring heat to said regenerator is operable to transfer heat thereto from the heat rejecting section of said second refrigeration apparatus.

57. Apparatus as claimed in claim 55 wherein said means for transferring heat to said regenerator is operable to transfer heat thereto from means for converting a fuel into electricity and heat.

58. Apparatus as claimed in claim 57 wherein said means for converting a fuel into electricity and heat includes an internal combustion engine.

59. Apparatus as claimed in claim 57 wherein said means for converting a fuel into electricity and heat includes a Stirling engine.

60. Apparatus as claimed in claim 57 wherein said means for converting a fuel into electricity and heat includes a fuel cell.

61. Apparatus as claimed in claim 55 wherein said second refrigeration apparatus is of the direct-fired absorption type where heat from the combustion of a fuel provides the energy required by the apparatus.

62. Apparatus as claimed in claim 61 wherein said means for transferring heat to the regenerator of said dehumidifier is operable to transfer heat thereto from the combustion of a fuel by the direct-fired absorption refrigeration apparatus.

63. Apparatus as claimed in claim 55 wherein said second refrigeration apparatus is absorption apparatus, and which includes means for converting a fuel into electricity and heat which is operable to transfer heat thereto to energize said second refrigeration apparatus.

64. Apparatus as claimed in claim 63 wherein said means for converting a fuel into electricity and heat includes an internal combustion engine.

65. Apparatus as claimed in claim 63 wherein said means for converting a fuel into electricity and heat includes a Stirling engine.

66. Apparatus as claimed in claim 63 wherein said means for converting a fuel into electricity and heat includes a fuel cell.

67. Apparatus as claimed in claim 55 wherein said second refrigeration apparatus is operable to make and store ice, and said means for transferring heat from the condenser of said first refrigeration apparatus is operable to transfer the heat first to ice that has been made and then stored, and then to the heat absorbing section of said second refrigeration apparatus.

68. Apparatus as claimed in claim 1 which additionally includes a humidistat-controller operable to sense the humidity of the closed space and to increase or decrease the rate at which dehumidified air is delivered to the closed space, as required, to maintain a desired humidity.

69. Apparatus as claimed in claim 1 which additionally includes at least one air bar assembly comprising an air delivery section including an elongate channel mounted at substantially the level of a dropped ceiling above the enclosed space, said channel having a web at the top thereof and opposed, downwardly extending sidewalls, and means operatively associated with said channel and effective in combination therewith to form a duct having the web of said channel as one wall, there being openings through the web of said channel, and wherein said means for causing air to flow in dehumidifying relationship with said dehumidifier and then into said space is operable to introduce the air into the duct of said air bar assembly, said assembly being operable, when air is introduced into the duct, to cause that air to discharge downwardly through the openings in the web of said channel into the space, and to cause a circulation of space air and mixing thereof with the discharged air.

70. Apparatus as claimed in claim 69 which additionally includes an induction mixing unit comprising a fan positioned to discharge into the duct of said air bar assembly, and having an opening through which said fan can induce a flow of air from the space, and wherein said means for causing air to flow in dehumidifying relationship with said dehumidifier and then into the space is operable to introduce the air into said induction mixing unit for mixture with the induced space air and delivery mixed therewith into the duct of said air bar assembly.

71. Apparatus as claimed in claim 69 wherein the openings through the web of said channel are nozzles positioned to discharge downwardly through the web, and wherein there are openings extending longitudinally of the sidewalls of said channel, air flowing from the duct of said air bar assembly being operable to induce a flow of air from outside the assembly through the openings in the sidewalls of said channel, and the assembly being operable to discharge below the dropped ceiling a mixture of such induced air and of air from said duct.

72. Apparatus as claimed in claim 13 wherein said means for converting a fuel into electricity and heat is operable to transfer heat from exhaust gases produced by the internal combustion engine to energize said second refrigeration apparatus.

73. Apparatus as claimed in claim 72 wherein said means for converting a fuel into electricity and heat includes means for circulating a coolant through said internal combustion engine and wherein said means for transferring heat to said regenerator is operable to transfer heat thereto from said coolant.

74. Apparatus as claimed in claim 28 wherein said means for converting a fuel into electricity and heat is operable to transfer heat from exhaust gases produced by the internal combustion engine to energize said second refrigeration apparatus.

75. Apparatus as claimed in claim 74 wherein said means for converting a fuel into electricity and heat includes means for circulating a coolant through said internal combustion engine and wherein said means for transferring heat to said regenerator is operable to transfer heat thereto from said coolant.

76. Apparatus as claimed in claim 51 wherein said means for converting a fuel into electricity and heat is operable to transfer heat from exhaust gases produced by the internal combustion engine to energize said second refrigeration apparatus.

77. Apparatus as claimed in claim 76 wherein said means for converting a fuel into electricity and heat includes means for circulating a coolant through said internal combustion engine and wherein said means for transferring heat to said regenerator is operable to transfer heat thereto from said coolant.

78. Apparatus as claimed in claim 64 wherein said means for converting a fuel into electricity and heat is operable to transfer heat from exhaust gases produced by the internal combustion engine to energize said second refrigeration apparatus.

79. Apparatus as claimed in claim 78 wherein said means for converting a fuel into electricity and heat includes means for circulating a coolant through said internal combustion engine and wherein said means for transferring heat to said regenerator is operable to transfer heat thereto from said coolant.

80. Apparatus as claimed in claim 1 which additionally includes means for converting a fuel into electricity and heat, wherein said second refrigeration apparatus is absorption apparatus, and wherein said means for converting a fuel into electricity and heat is operable to transfer heat thereto to energize said second refrigeration apparatus.

81. Apparatus as claimed in claim 80 wherein said means for converting a fuel into electricity and heat includes an internal combustion engine.

82. Apparatus as claimed in claim 81 wherein said means for converting a fuel into electricity and heat is operable to transfer heat from exhaust gases produced by the internal combustion engine to energize said second refrigeration apparatus.

83. Apparatus as claimed in claim 82 wherein said means for converting a fuel into electricity and heat includes means for circulating a coolant through said internal combustion engine and wherein said means for transferring heat to said regenerator is operable to transfer heat thereto from said coolant.

84. Apparatus as claimed in claim 1 wherein said means for transferring heat to said regenerator is operable to transfer heat thereto from means for converting a fuel into electricity and heat.

85. Apparatus as claimed in claim 84 wherein said means for converting a fuel into electricity and heat includes an internal combustion engine.

86. Apparatus as claimed in claim 85 wherein said means for converting a fuel into electricity and heat includes means for circulating a coolant through said internal combustion engine and wherein said means for transferring heat to said regenerator is operable to transfer heat thereto from said coolant.

87. Apparatus as claimed in claim 86 wherein said means for converting a fuel into electricity and heat is operable to transfer heat from exhaust gases produced by the internal combustion engine to energize said second refrigeration apparatus.

88. Apparatus as claimed in claim 7 wherein said means for converting a fuel into electricity and heat includes means for circulating a coolant through said internal combustion engine and wherein said means for transferring heat to said regenerator is operable to transfer heat thereto from said coolant.

89. Apparatus as claimed in claim 88 wherein said means for converting a fuel into electricity and heat is operable to transfer heat from exhaust gases produced by the internal combustion engine to energize said second refrigeration apparatus.

90. Apparatus as claimed in claim 22 wherein said means for converting a fuel into electricity and heat includes means for circulating a coolant through said internal combustion engine and wherein said means for transferring heat to said regenerator is operable to transfer heat thereto from said coolant.

91. Apparatus as claimed in claim 90 wherein said means for converting a fuel into electricity and heat is operable to transfer heat from exhaust gases produced by the internal combustion engine to energize said second refrigeration apparatus.

92. Apparatus as claimed in claim 45 wherein said means for converting a fuel into electricity and heat includes means for circulating a coolant through said internal combustion engine and wherein said means for transferring heat to said regenerator is operable to transfer heat thereto from said coolant.

93. Apparatus as claimed in claim 92 wherein said means for converting a fuel into electricity and heat is operable to transfer heat from exhaust gases produced by the internal combustion engine to energize said second refrigeration apparatus.

94. Apparatus as claimed in claim 58 wherein said means for converting a fuel into electricity and heat includes means for circulating a coolant through said internal combustion engine and wherein said means for transferring heat to said regenerator is operable to transfer heat thereto from said coolant.

95. Apparatus as claimed in claim 94 wherein said means for converting a fuel into electricity and heat is operable to transfer heat from exhaust gases produced by the internal combustion engine to energize said second refrigeration apparatus.

96. Apparatus as claimed in claim 1 wherein said second refrigeration apparatus is operable to make and store ice, and said means for transferring heat from the condenser of said first refrigeration apparatus is operable to transfer the heat first to ice that has been made and then stored, and then to the heat absorbing section of said second refrigeration apparatus.

97. Apparatus as claimed in claim 1 wherein said dehumidifier is one which supports a desiccant through which, alternately, air to be dehumidified and regenerating air flow in contact with the desiccant.

98. Apparatus as claimed in claim 1 which additionally includes an induction mixing unit comprising a fan positioned to discharge conditioned air for delivery to said space, said induction mixing unit having an opening through which said fan can induce a flow of air from said space, and wherein said means for causing air to flow in dehumidifying relationship with said dehumidifier and then into the space is operable to introduce the air into said induction mixing unit for mixture with the induced space air and delivery mixed therewith to said space.

99. Apparatus as claimed in claim 98 which additionally includes means for transferring heat to or from said space.

* * * * *